(12) United States Patent
Tanaka et al.

(10) Patent No.: US 8,393,364 B2
(45) Date of Patent: Mar. 12, 2013

(54) REFUELLING CONTAINER FOR FUELCELL, METHOD FOR REFUELLING, AND HOLDER FOR REFUELLING CONTAINER

(75) Inventors: Masayoshi Tanaka, Yokohama (JP); Kenji Yoshihiro, Yokohama (JP); Kenjiro Tanaka, Yokohama (JP); Daisuke Imoda, Yokohama (JP); Kenichi Takahashi, Tokyo (JP); You Yamamori, Yokohama (JP); Shouzou Shintani, Yokohama (JP); Kinuyo Shintani, legal representative, Higashi-Osaka (JP); Koichi Narutaki, Yokohama (JP)

(73) Assignees: Toyo Seikan Kaisha, Ltd., Tokyo (JP); Kabushiki Kaisha Toshiba, Tokyo (JP)

( * ) Notice: Subject to any disclaimer, the term of this patent is extended or adjusted under 35 U.S.C. 154(b) by 851 days.

(21) Appl. No.: 11/990,740

(22) PCT Filed: Sep. 11, 2006

(86) PCT No.: PCT/JP2006/317974
§ 371 (c)(1),
(2), (4) Date: Dec. 1, 2008

(87) PCT Pub. No.: WO2007/032309
PCT Pub. Date: Mar. 22, 2007

(65) Prior Publication Data
US 2011/0139300 A1 Jun. 16, 2011

(30) Foreign Application Priority Data
Sep. 12, 2005 (JP) ................................. 2005-264230

(51) Int. Cl.
*B65B 3/16* (2006.01)

(52) U.S. Cl. .............. 141/114; 141/4; 141/39; 141/366; 222/95; 222/105

(58) Field of Classification Search .................. 141/4, 5, 141/7, 39, 45, 59, 114, 319, 366; 222/92, 222/95, 105; 220/23.91, 723; 429/513
See application file for complete search history.

(56) References Cited

U.S. PATENT DOCUMENTS 3,926,341 A * 12/1975 Lhoest ........................... 222/95
5,913,342 A * 6/1999 McGill ............................ 141/1
6,924,054 B2 8/2005 Prasad et al.
(Continued)

FOREIGN PATENT DOCUMENTS

JP S63-046381 U 3/1988
JP H02-102390 U 8/1990
(Continued)

*Primary Examiner* — Gregory Huson
*Assistant Examiner* — Jason K Niesz
(74) *Attorney, Agent, or Firm* — Manabu Kanesaka

(57) ABSTRACT

In, for example, a direct methanol type fuelcell, fuel is allowed to be injected little by little when the fuel is injected and supplied from the outside to a fuel receiving part reduced in the amount of remaining fuel on the fuelcell body side and an electromotive part can be prevented from being damaged by keeping the pressure in the fuel receiving part at a fixed level or less when the fuel is injected. Specifically, when a fuel CL filled in a refuelling container C is injected into a fuel receiving part T in several lots, a fuel injecting operation is repeated in which the volume of the refuelling container C is shrunk and reduced to supply the fuel into the fuel receiving part T in a proper amount and then the original volume of the refuelling container is restored to thereby absorb the atmospheric gas in the fuel receiving part T, which makes it possible to inject fuel continuously without any hindrance to the injection of the fuel.

12 Claims, 19 Drawing Sheets

U.S. PATENT DOCUMENTS

2003/0192909 A1* 10/2003 Maskell .................. 222/103
2005/0211729 A1* 9/2005 Bassett et al. .............. 222/181.3
2008/0223479 A1* 9/2008 Bassett et al. .................. 141/2

FOREIGN PATENT DOCUMENTS

| JP | 2003-533860 | 11/2003 |
| JP | 2004-210313 A | 7/2004 |
| JP | 2004-319388 A | 11/2004 |
| JP | 2005-006726 | 1/2005 |
| JP | 2005-63726 A | 3/2005 |
| JP | 2005-071713 | 3/2005 |
| JP | 2005-203175 | 7/2005 |
| JP | 2006-302615 | 11/2006 |

* cited by examiner

REFUELLING CONTAINER FOR FUELCELL, METHOD FOR REFUELLING, AND HOLDER FOR REFULLING CONTAINER

BACKGROUND OF THE INVENTION

1. Field of the Invention

The present invention relates to a refuelling container for fuelcell, such as a direct methanol type fuelcell, using a system in which liquid fuel such as alcohols is directly supplied to cause an electrochemical reaction without using a reformer, the container being used to inject fuel from the outside to refuel in a fuel receiving part of the cell body side in which small fuel remains. The present invention also relates to a method for refuelling and a holder for refuelling container.

2. Description of the Related Art

In recent years, an attention has been focused on a direct methanol type fuelcell (DMFC) in which fuel methanol is supplied directly to an anode (fuel electrode) to cause an electrochemical reaction without using a reformer producing protons, as a fuelcell for portable devices because this fuelcell is suitable for miniaturization of devices. Also, various fuel supply means in these DMFCs have been proposed.

For example, in Japanese Patent Application Laid-open (JP-A) No. 2004-319388, there are descriptions concerning a fuelcell for portable devices which is provided with a fuel container, at least a part of which is constituted of a flexible member and to which fuel is supplied by a pump.

Also, JP-A No. 2005-71713 describes a liquid type fuelcell in which a fuel-receiving container is constituted of a fuel tank disposed in a casing and a fuel cartridge fitted to the fitting part of the fuel tank in a dismountable manner wherein the fuel cartridge is made to have a double structure constituted of an outside container composed of a hard case and a highly shrinkable inside container received in the outside container and liquid fuel is filled in the inside container.

Also, JP-A No. 2005-63726 describes that methanol is injected into the fuel receiving part of a fuelcell by squeezing a refueling container which is integrated by molding a flexible resin and in which methanol is sealed, by human hands.

SUMMARY OF THE INVENTION

In the meantime, DMFCs are largely classified into an active type and a passive type by the supply system of the fuel. The active type is one using a system in which fuel is supplied and circulated to a fuelcell by utilizing a pump and the fuelcell described in JP-A No. 2004-319388 (the fuelcell system shown in FIG. 6 of JP-A No. 2004-319388) is a typical example of this system. Such an active type DMFC is convenient to obtain high electric power, but on the other hand, is disadvantageous to the miniaturization of devices because it requires a mechanical fuel supply means such as a pump.

Also, the DMFC disclosed in JP-A No. 2005-71713 does not directly use a pump, but includes a bulky fuel receiving container in which a fuel tank is disposed in a casing of the DMFC and a fuel cartridge provided with a hard casing is fitted to the fitting part of the fuel tank, and may be therefore said to have a disadvantageous structure for miniaturization of devices.

On the other hand, the passive type is one using a system in which fuel is supplied by utilizing convection or concentration gradient and is most suitable for miniaturization of devices because any mechanical fuel supply means is not used. For example, the fuelcell system (see, FIG. 1 of JP-A No. 2005-63726) described in JP-A No. 2005-63726 is a typical example. When this passive system is applied to a portable device which is strongly desired to be miniaturized and particularly to those reduced in power consumption, the actual and practical structure of a fuelcell system is considered to be as follows: each structure of a fuel supply means and a fuel receiving part is made to be as simple as possible, the amount of fuel to be stored is designed to be necessary minimum and fuel is injected and supplied from the outside according to the need every time when the fuel is running short.

In the case of squeezing a flexible refueling container by human hand to inject fuel as described in JP-A No. 2005-63726 when injecting and supplying fuel from the outside to the fuel receiving part of the fuelcell body side, it is considered that the internal pressure of the fuel receiving part is raised, for example, because an excess amount is injected and therefore, an electromotive part constituted of electrodes and an electrolyte film is damaged. In order to prevent the electromotive part from being damaged by fuel injection from the outside, it is considered to be effective to keep the pressure in the fuel receiving part at lower than a fixed level when injecting fuel to suppress the load on the electromotive part. However, any study concerned has not been made at all in JP-A No. 2005-63726.

Also, JP-A No. 2004-319388 describes an aspect in which pressure is applied by the elastic force of a spring to a fuel container received in a casing via flat plate. This, however, only enables fuel to be supplied stably even if fuel in a fuel container is decreased, and any consideration is not given at all to the load on the electromotive part when a fuel container is squeezed by hand to inject fuel.

Moreover, when fuel is injected from the outside, the pressure in a body side fuel receiving part is positive by the injection of the fuel. In order to eliminate the positive state, it is necessary to remove gas from the fuel receiving part. In the case of continuously injecting fuel little by little in several lots to keep the pressure in the fuel receiving part at a fixed pressure or less when injecting fuel, it is considered that there is a hindrance to the injection of the fuel if gas is removed from the fuel receiving part.

However, as is clarified from the fact that in JP-A No. 2004-319388, the flexible member shrinks with discharge of fuel to determine the residual amount of fuel from the shape of the container with ease, this cell is structured so that the removal of the gas in the fuel receiving part cannot be performed after the fuel is injected. It is therefore difficult to apply the fuel supply means described in JP-A No. 2004-319388 as it is to a fuel supply means used to inject fuel for refuelling from the outside. Also, JP-A No. 2005-71713 describes an aspect in which the inside container of a fuel cartridge is constituted of a rubber-like material and put into an expanded state like a balloon to receive liquid fuel and then to makeup the fuel. It is however difficult to apply the aspect like this as it is to a fuel supply means used to inject fuel for refuelling from the outside.

The present invention has been made based on the foregoing studies made by the inventors of the present invention. It is an object of the present invention to provide a refuelling container for fuelcell, which allows fuel to be injected little by little when the fuel is injected for refuelling from the outside to a fuel receiving part reduced in the amount of remaining fuel on the fuelcell body side and can prevent an electromotive part from being damaged by keeping the pressure in the fuel receiving part at lower than a fixed level when the fuel is injected in a direct methanol type fuelcell. The present invention also provides a method for refuelling and a holder for refuelling container.

The above problems can be solved by a refuelling container for fuelcell according to the present invention wherein the container is used to inject fuel for refuelling from the outside to a fuel receiving part of a fuelcell body, the container including squeezing and reducing its volume while keeping airtight communication with the inside of the fuel receiving part to inject the fuel in a predetermined amount and then restoring its original volume to absorb the atmospheric gas in the fuel receiving part.

The refuelling container for fuelcell according to the present invention ensures that even in the case of continuously injecting fuel little by little in several lots to keep the pressure at lower than a fixed level when the fuel is injected into the fuel receiving part of the fuelcell body, there is no hindrance to the injection of the fuel, enabling a continuous fuel injecting operation.

Also, the refuelling container for fuelcell according to the present invention may have a structure in which it is formed of a flexible material. Such a structure makes it easy to squeeze and reduce the volume of the container and to restore its original volume.

Also, the refuelling container for fuelcell according to the present invention may have a structure in which the relationship given by the following equation (1) is established when the volume of the fuel receiving part is $V_T$, the volume of the fuel in the fuel receiving part just before a fuel injecting operation is $V_{TL}$, the volume of the refuelling container is $V_c$, the volume of the fuel in the refuelling container just before a fuel injecting operation is $V_{CL}$, a reduction in the volume of the refuelling container when the fuel is injected is Vs, allowable pressure in the fuel receiving part is Ptf and the environmental pressure is P.

$$(V_c - V_{CL} + V_T - V_{TL})/(V_c - V_{CL} + V_T - V_{TL} - Vs) \leq Ptf/P \tag{1}$$

Such a structure ensures that, when the fuel is injected into the fuel receiving part of the fuelcell body, the pressure in the fuel receiving part can be kept at lower than an allowable fixed pressure to suppress the load on the electromotive part disposed adjacent to the fuel receiving part of the fuelcell, thereby preventing the electromotive part from being damaged.

Also, the refuelling container for fuelcell according to the present invention may have a structure in which the relationship given by the following equation (2) is established when the target volume of the fuel to be received in the fuel receiving part is Vf, the number of fuel injecting operations necessary to reach the target volume Vf is X, the volume of the fuel in the fuel receiving part just before the ith fuel injecting operation is $V_{TL}i$ and the volume of the fuel in the refuelling container just before the ith fuel injecting operation is $V_{CL}i$.

$$Vf - V_{TL} = \sum_{i=1}^{x} ((V_T - V_{TL}i) \times Vs/(V_c - V_{CL}i + V_T - V_{TL}i)) \tag{2}$$

In the above formula, i is an integer from 1 to X.

Such a structure makes it possible to design the refuelling container such that the number of fuel injecting operations necessary for the volume of the fuel in the fuel receiving part to reach the maximum receivable volume is decreased while keeping the pressure in the fuel receiving part at lower than an allowable pressure by defining the number of fuel injecting operations so as to establish the above relationship given by the above equation (2).

The refuelling container for fuelcell according to the present invention may have a structure in which it is received in a holder which is made of a rigid material and provided with an operation part reducing the volume of the above refuelling container.

Such a structure makes it easy to carry the refuelling container and particularly when the refuelling container is formed of a flexible material, fuel leakage and the like can be avoided effectively and it is therefore possible to improve safety when the container is carried.

The refuelling container for fuelcell according to the present invention may have a structure in which a limiting mechanism is disposed in an operation part of the above holder such that the reduced volume of the above refuelling container does not exceed a fixed volume.

Such a structure eliminate the necessity of the provision of the limiting mechanism that prevents the reduced volume of the above refuelling container from exceeding a fixed volume, and can more prevent damages to the electromotive part disposed adjacent to the fuel receiving part of the fuelcell without fail in such a manner that the amount of the fuel to be injected into the fuel receiving part of the fuelcell body does not exceed a fixed level though the refuelling container is itself made to have a simple structure.

Also, a method of refuelling according to the present invention is a method in which fuel sealed in a refuelling container is injected into and supplied to a fuel receiving part of a fuelcell body from the outside, the method including carrying out at least one fuel injecting operation of squeezing and reducing the volume of the refuelling container while keeping airtight communication with the inside of the fuel receiving part to inject the fuel contained in the refuelling container in a predetermined amount and then restoring its original volume of the refuelling container to allow the refuelling container to absorb the atmospheric gas contained in the fuel receiving part, wherein the relationship given by the following equation (1) is established when the volume of the fuel receiving part is $V_T$, the volume of the fuel in the fuel receiving part just before the fuel injecting operation is $V_{TL}$, the volume of the refuelling container is $V_c$, the volume of the fuel in the refuelling container just before the fuel injecting operation is $V_{CL}$, the shrunk and reduced volume of the refuelling container when the fuel is injected is Vs, allowable pressure in the fuel receiving part is Ptf and the environmental pressure is P.

$$(V_c - V_{CL} + V_T - V_{TL})/(V_c - V_{CL} + V_T - V_{TL} - Vs) \leq Ptf/P \tag{1}$$

Such a structure of the method of refuelling according to the invention ensures that when fuel is supplied to the fuel receiving part of the fuelcell body, the pressure in the fuel receiving part can be kept at lower than an allowable fixed pressure to prevent damages to the electromotive part disposed adjacent to the fuel receiving part of the fuelcell.

Also, a holder for refuelling container according to the present invention is a holder made of a rigid material for receiving a refuelling container injecting and supplying fuel to the above fuel receiving part from the outside by carrying out a fuel injecting operation of squeezing to reduce the volume of the refuelling container while keeping airtight communication with the inside of the fuel receiving part to inject the fuel in a predetermined amount and then restoring its original volume to absorb the atmospheric gas contained in the fuel receiving part, the holder being provided with an operation part that squeezes and reduces the volume of the above refuelling container.

The holder for refuelling container having such a structure according to the present invention enables a fuel injecting operation of continuously injecting fuel filled in the refuelling container into the fuel receiving part of a fuelcell body little by little in several lots, makes it easy to carry the refuelling container and prevents the leakage of fuel efficiently to improve safety when the refuelling container is carried.

In the holder for refuelling container according to the present invention, the above operation part is provided with a lever fitted thereto in a rotatable manner, wherein when the lever is pushed down by a rotating operation, the above lever may be pressed against the refuelling container to squeeze and reduce the volume of the above refuelling container.

Also, the holder for refuelling container according to the present invention may have a structure in which at least the lever is formed by molding by a highly transparent material.

Such a structure ensures that the state of the received refuelling container, for example, the amount of the fuel left in the refuelling container can be observed visually.

Also, the holder for refuelling container according to the present invention may have a structure in which a protrusion is formed such that it partially surrounds the side surface of the above lever and is protruded so as to project on the same plane as or from the operating plane of the above lever, to thereby restrict the movable range of the above lever.

Such a structure prevents the lever from being pushed down carelessly when it is carried in a bag and the like or erroneously is dropped.

Also, the holder for refuelling container according to the present invention may have a structure in which the refuelling container is designed to establish the relationship given by the following equation (1) when the volume of the fuel receiving part is $V_T$, the volume of the fuel in the fuel receiving part just before the fuel injecting operation is $V_{TL}$, the volume of the refuelling container is $V_c$, the volume of the fuel in the refuelling container just before the fuel injecting operation is $V_{CL}$, the shrunk and reduced volume of the refuelling container when the fuel is injected is Vs, allowable pressure in the fuel receiving part is Ptf and the environmental pressure is P.

$$(V_c - V_{CL} + V_T - V_{TL})/(V_c - V_{CL} + V_T - V_{TL} - Vs) \leq Ptf/P \quad (1)$$

Such a structure ensures that when fuel is injected to the fuel receiving part of the fuelcell body, the pressure in the fuel receiving part can be kept at lower than an allowable fixed pressure to limit the load on the electromotive part of the fuelcell, thereby preventing damages to the electromotive part disposed adjacent to the fuel receiving part of the fuelcell.

Also, the holder for refuelling container according to the present invention may have a structure in which the above refuelling container is designed to establish the relationship given by the following equation (2) when the target volume to be received in the fuel receiving part is Vf, the number of fuel injecting operations necessary to reach the target volume Vf is X, the volume of the fuel in the fuel receiving part just before the ith fuel injecting operation is $V_{TL}i$ and the volume of the fuel in the refuelling container just before the ith fuel injecting operation is $V_{CL}i$.

$$Vf - V_{TL} = \sum_{i=1}^{x} ((V_T - V_{TL}i) \times Vs/(V_c - V_{CL}i + V_T - V_{TL}i)) \quad (2)$$

In the above formula, i is an integer from 1 to X.

Such a structure makes it possible to design the refuelling container such that the number of fuel injecting operations necessary for the volume of the fuel in the fuel receiving part to reach the maximum receivable volume is decreased while keeping the pressure in the fuel receiving part at lower than an allowable pressure by defining the number of fuel injecting operations so as to establish the above relationship given by the above equation (2).

The holder for refuelling container according to the present invention may have a structure in which a limiting mechanism is disposed in an operation part of the holder such that the reduced volume of the above refuelling container does not exceed a fixed volume.

Such a structure eliminate the necessity of the provision of the limiting mechanism that prevents the reduced volume of the above refuelling container from exceeding a fixed volume in the refuelling container itself, and can prevent damages to the electromotive part disposed adjacent to the fuel receiving part of the fuelcell without fail in such a manner that the amount of the fuel to be injected into the fuel receiving part of the fuelcell body does not exceed a fixed level though the refuelling itself container is made to have a simple structure.

Also, the holder for refuelling container may have a structure in which a protective wall that is allowed to rise up so as to cover the opening part of the above refuelling container is disposed and a cap is screw-fitted to the above protective wall.

When the holder for refuelling container has such a structure, such disorders that the mouth part of the refuelling container is, for example, deformed to give a hindrance to screw-tightening and that the cap is fallen down can be prevented. Such an aspect is particularly preferable in the case where the refuelling container is formed using a soft material having flexibility so that it is difficult to secure the strength of the mouth part against the screw-tightening of the cap.

Also, the holder for refuelling container may have a structure in which the above refuelling container with a body part having an elliptic section in a horizontal direction is received such that the above operation part faces the plane along the direction of the major diameter of the above body part.

Such a structure ensures that because, usually, the plane along the direction of the major diameter of the body part of the refuelling container is more stretched and is made thinner than the plane along the direction of a minor diameter when molded, it is easy to squeeze and reduce the volume of the fuel container and to control the amount of the reduction if it is designed that the operation part pushes to elastically deform the refuelling container.

According to the present invention, it is possible to carry out a fuel injecting operation for continuously injecting the filled fuel little by little in several lots into the fuel receiving part of the fuelcell body when fuel is injected from the outside. Also, the refuelling container enabling such a fuel injecting operation is easily carried and fuel leakage from the refuelling container is effectively avoided, whereby the safety when the cell is carried can be improved.

BRIEF DESCRIPTIONS OF THE DRAWINGS

FIGS. 1(a) to 1(c) are explanatory views conceptually showing one cycle of a fuel injecting operation for injecting fuel for refuelling from the outside to a fuel receiving part of a fuelcell body by a refuelling container for fuelcell according to the present invention.

FIGS. 2(a) and 2(b) are explanatory views showing an example of the condition of a refuelling container received in a holder.

Figure 7:
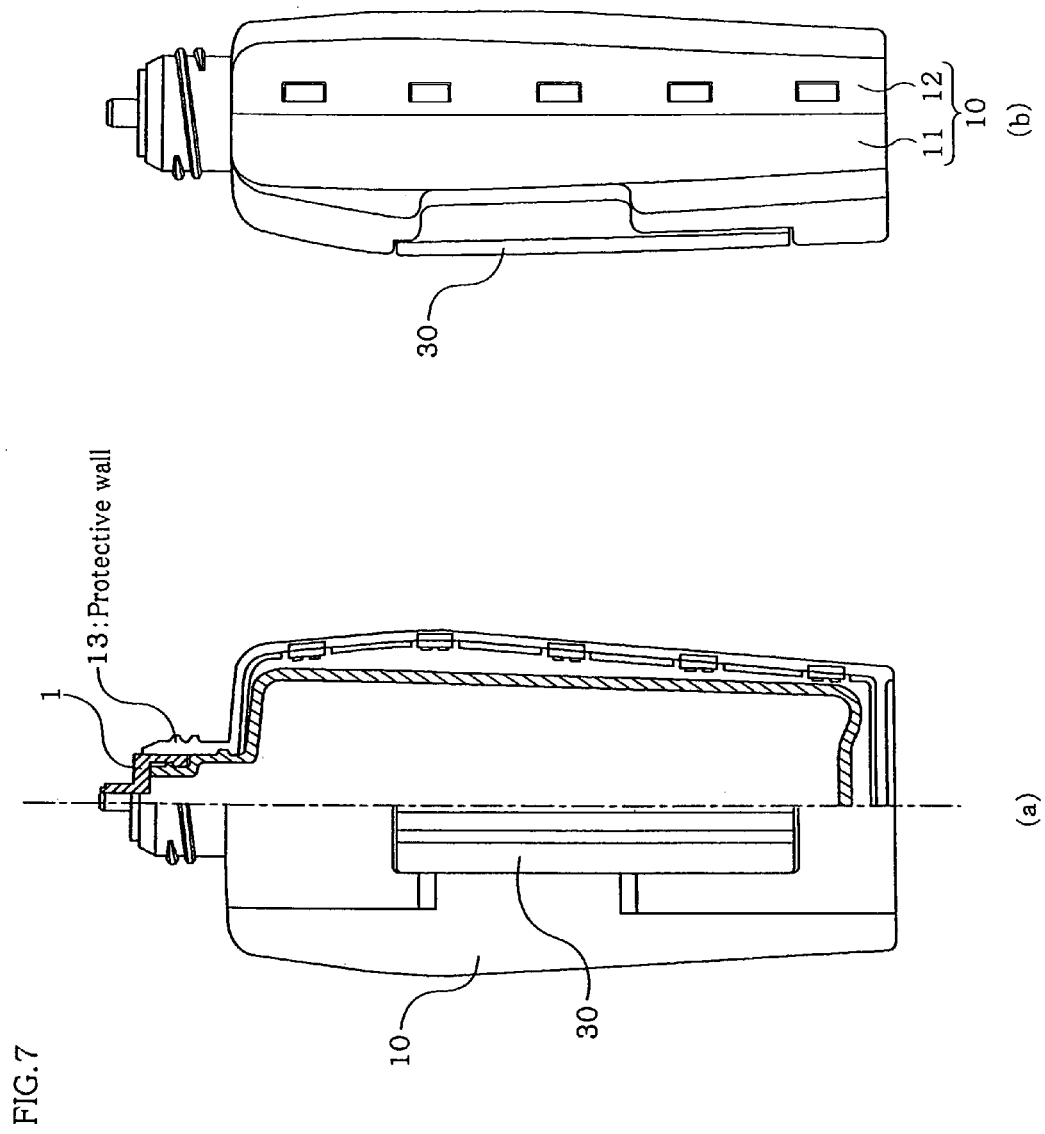

FIGS. 7(*a*) and 7(*b*) are explanatory views showing another example of the condition of a refuelling container received in a holder.

Figure 8:
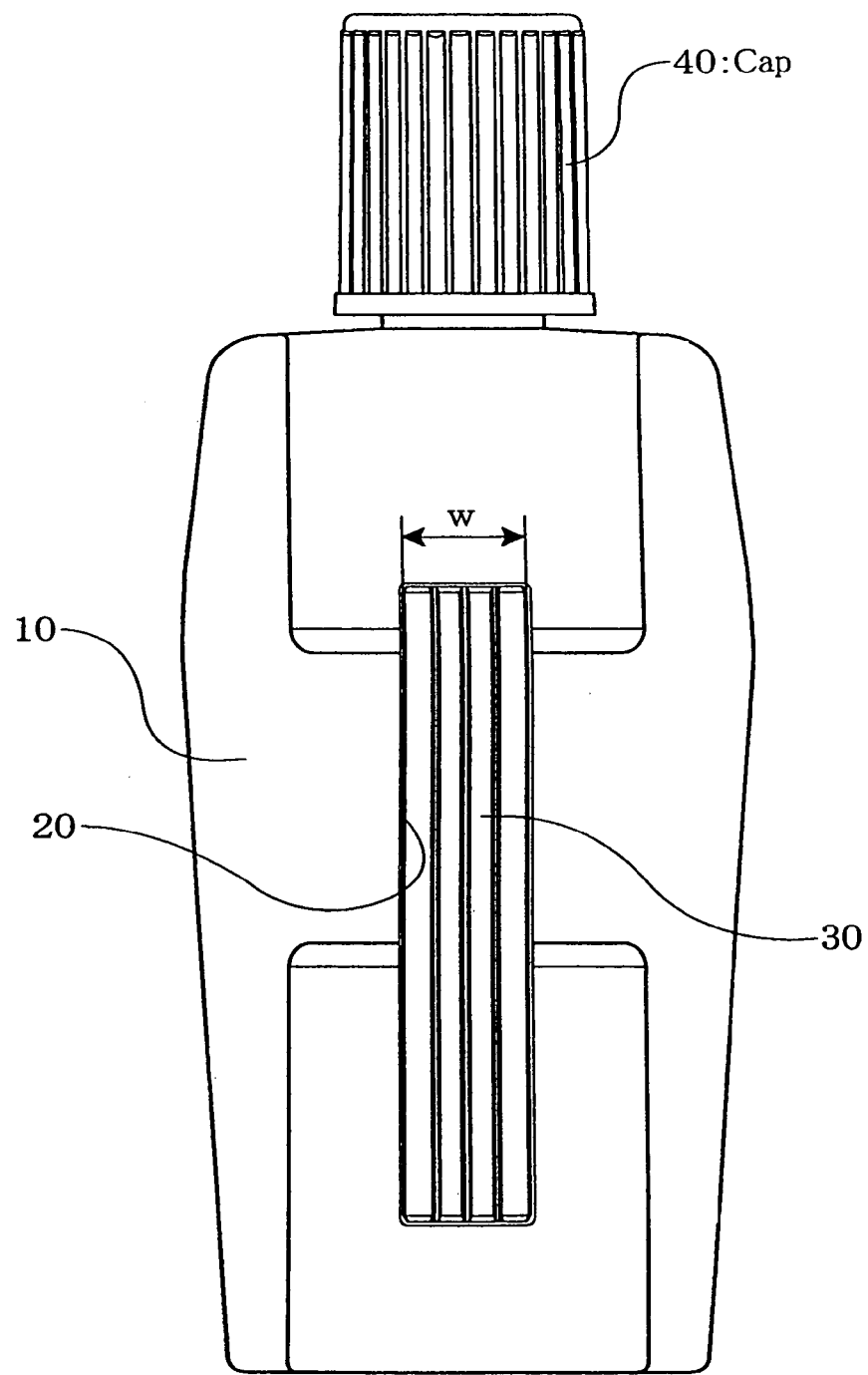

FIG. 8 is an explanatory view showing a further example of the condition of a refuelling container received in a holder.

Figure 9:
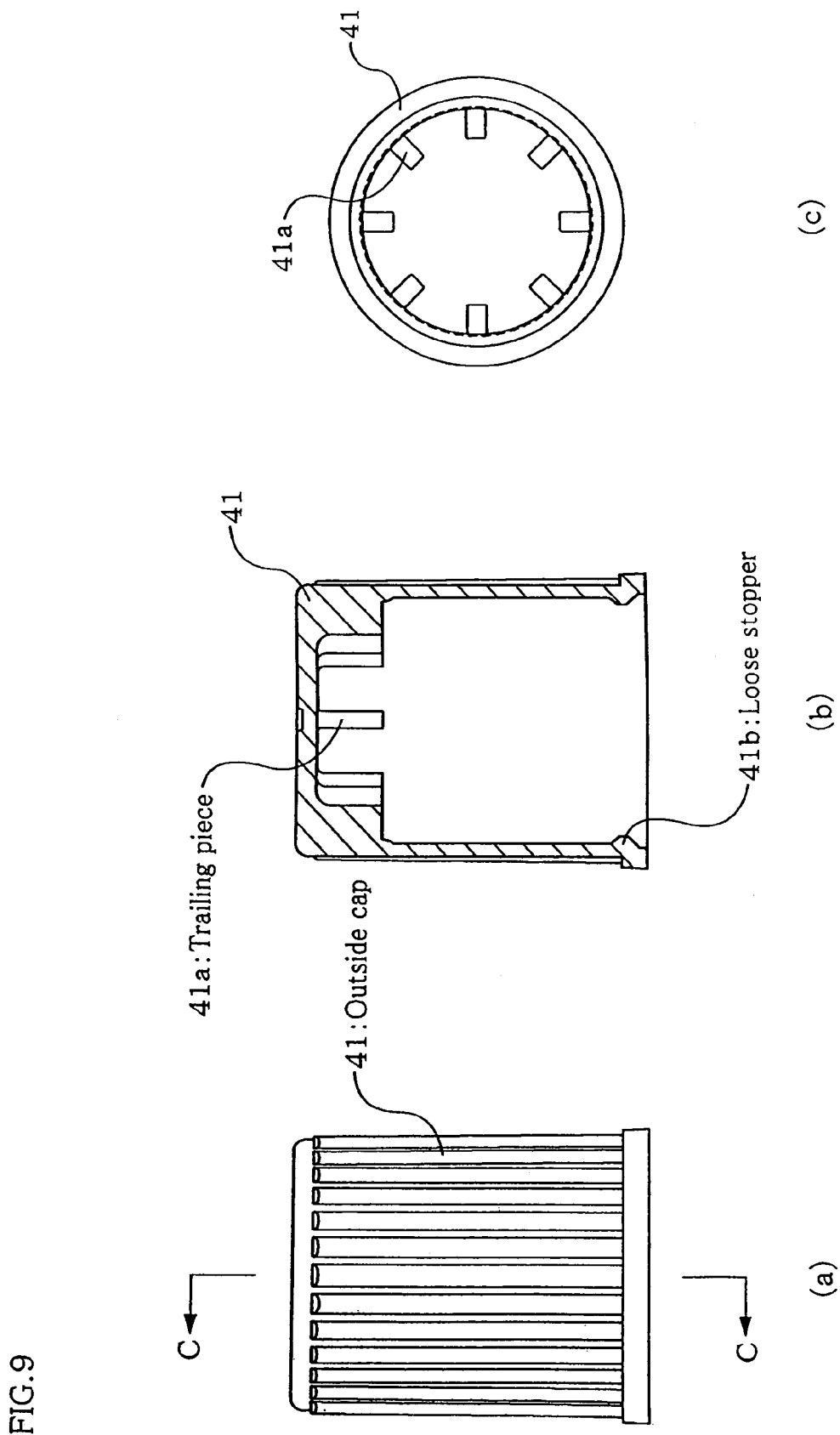

FIGS. 9(*a*) to 9(*c*) are explanatory views showing one example of an outside cap constituting a cap.

Figure 10:
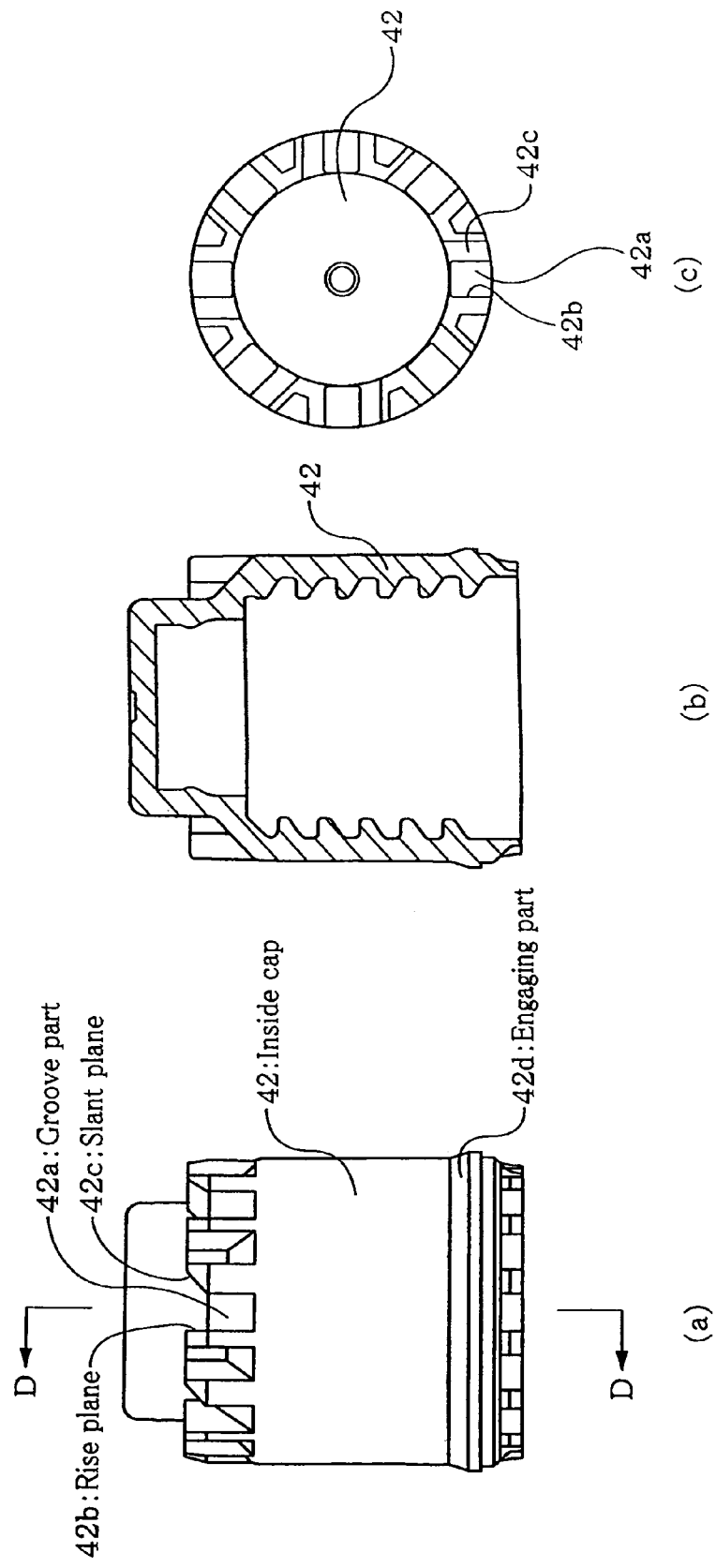

FIGS. 10(*a*) to 10(*c*) are explanatory views showing one example of an inside cap constituting a cap.

Figure 11:
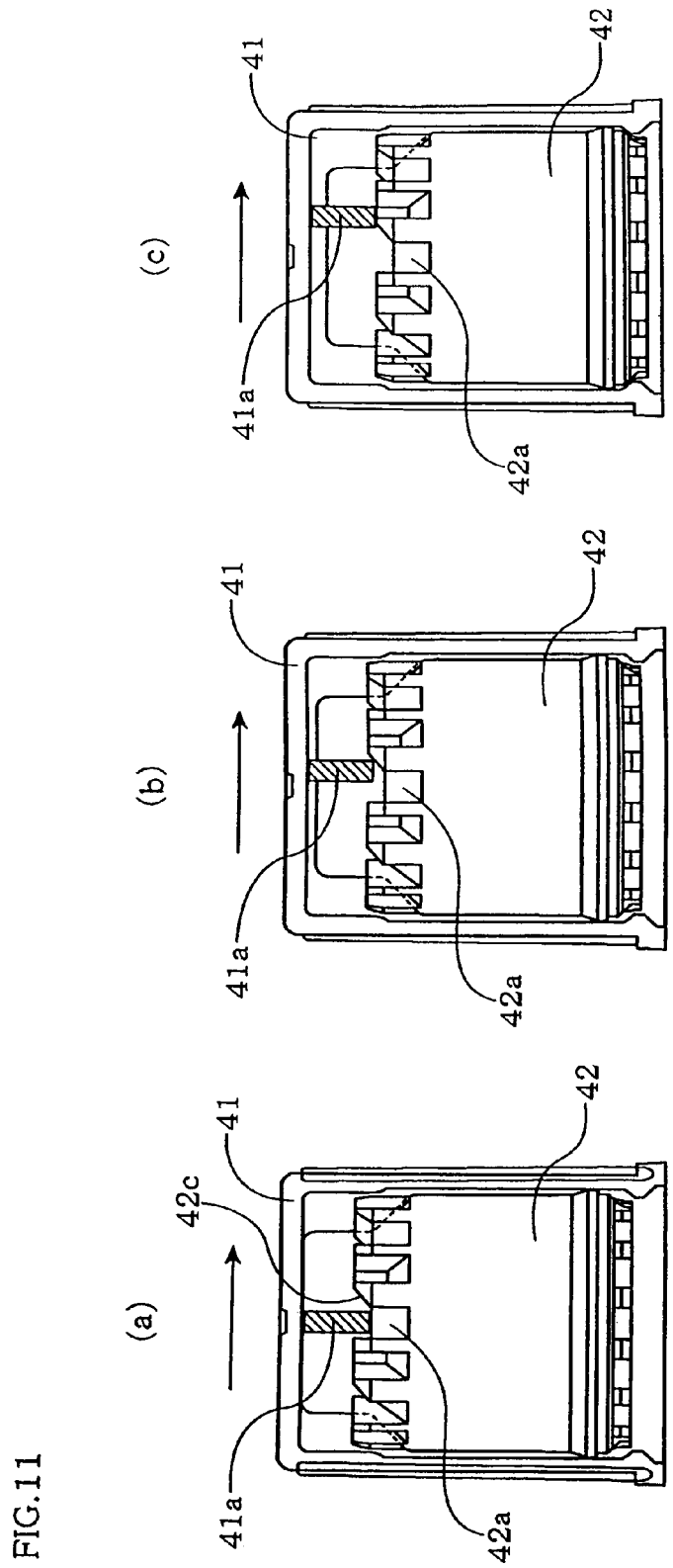

FIGS. 11(*a*) to 11(*c*) are explanatory views showing the movements of a cap when an outside cap is spun with respect to an inside cap.

Figure 12:
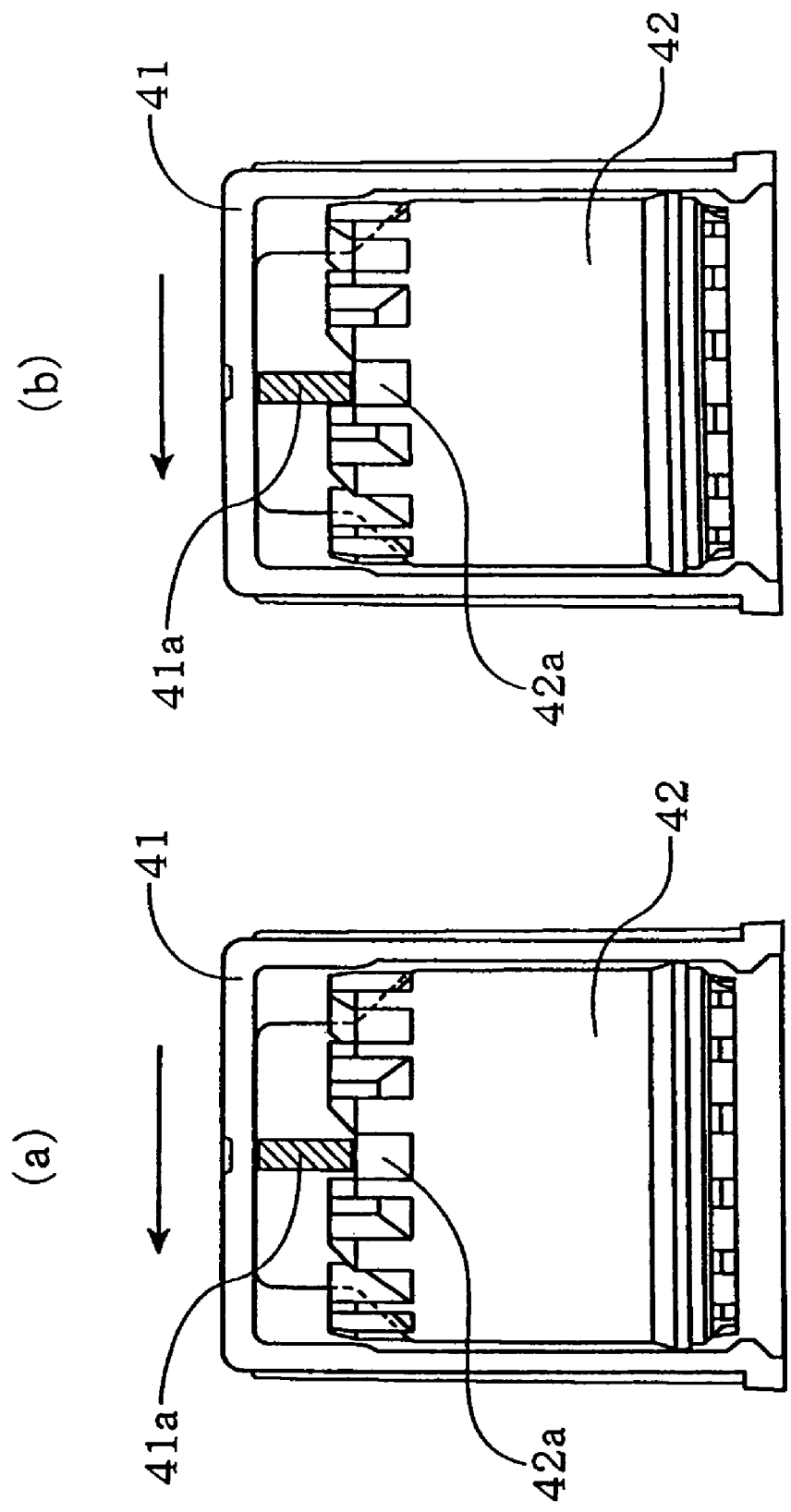

FIGS. 12(*a*) and 12(*b*) are explanatory views showing the movements of a cap when it is fastened.

Figure 13:
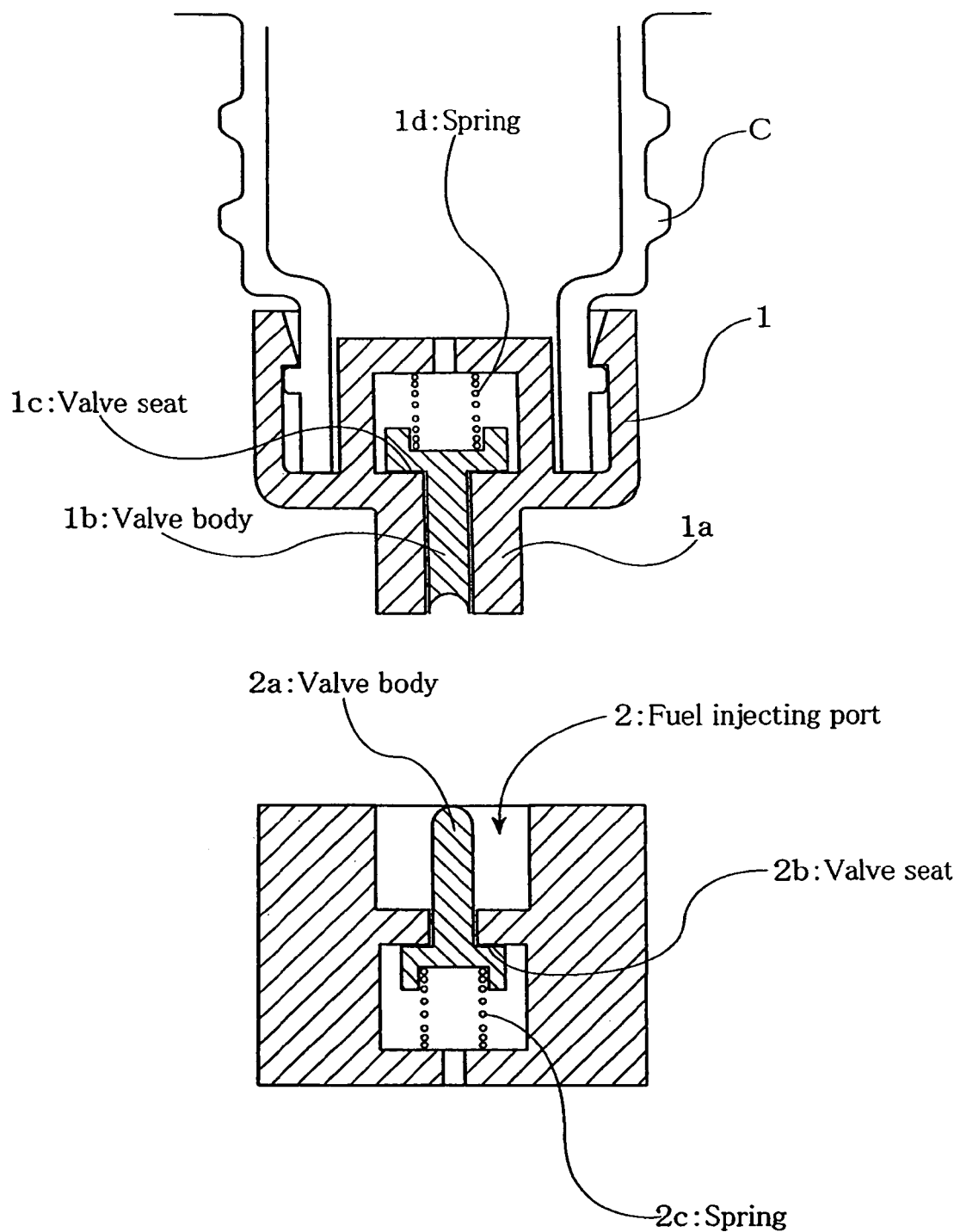

FIG. 13 is an explanatory view conceptually showing an example of a valve mechanism which joins a refuelling container with a fuel receiving part.

Figure 14:
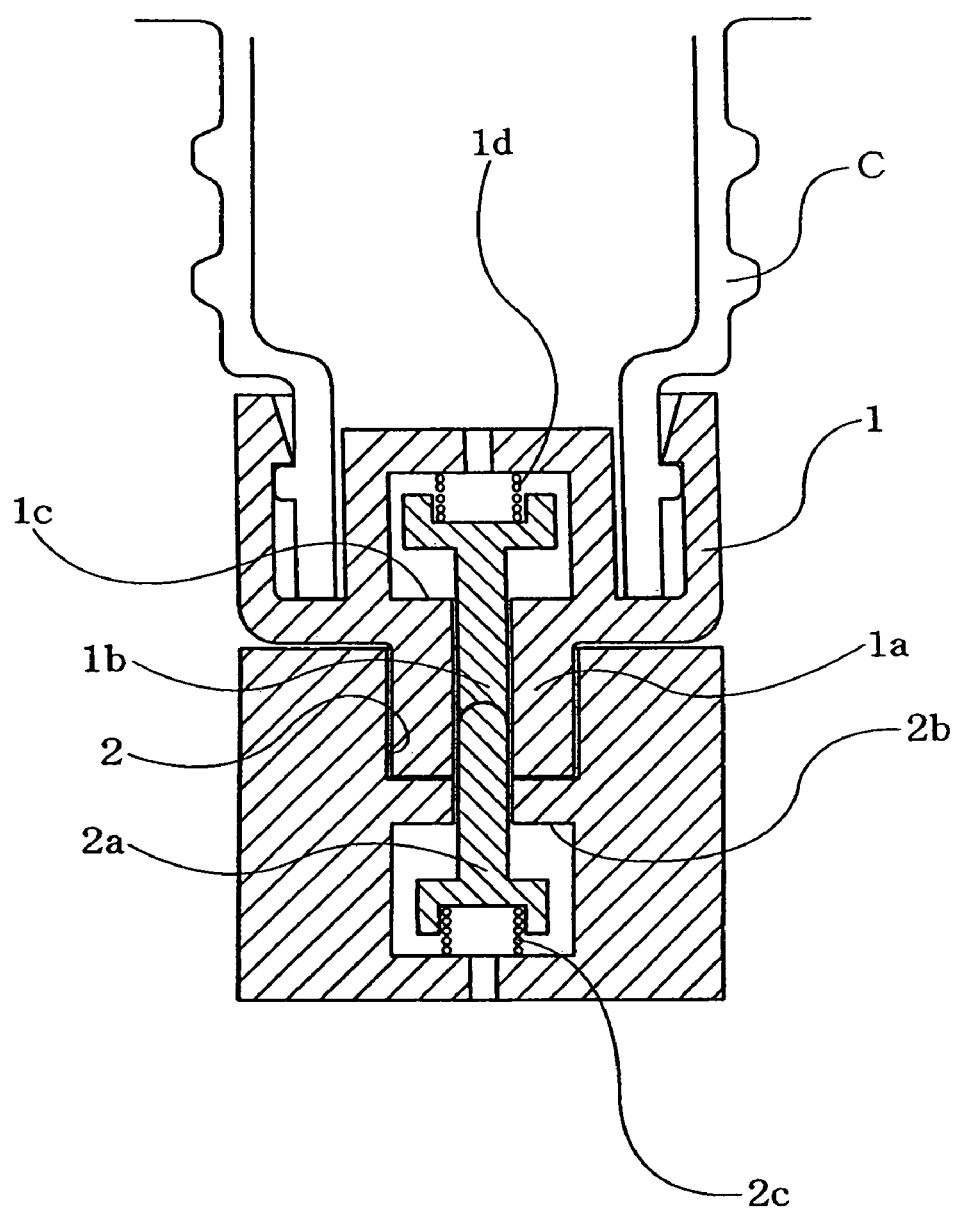

FIG. 14 is an explanatory view conceptually showing the condition that a fuel ejecting port of the refuelling container is engaged with a fuel injecting port of a fuel receiving part.

Figure 15:
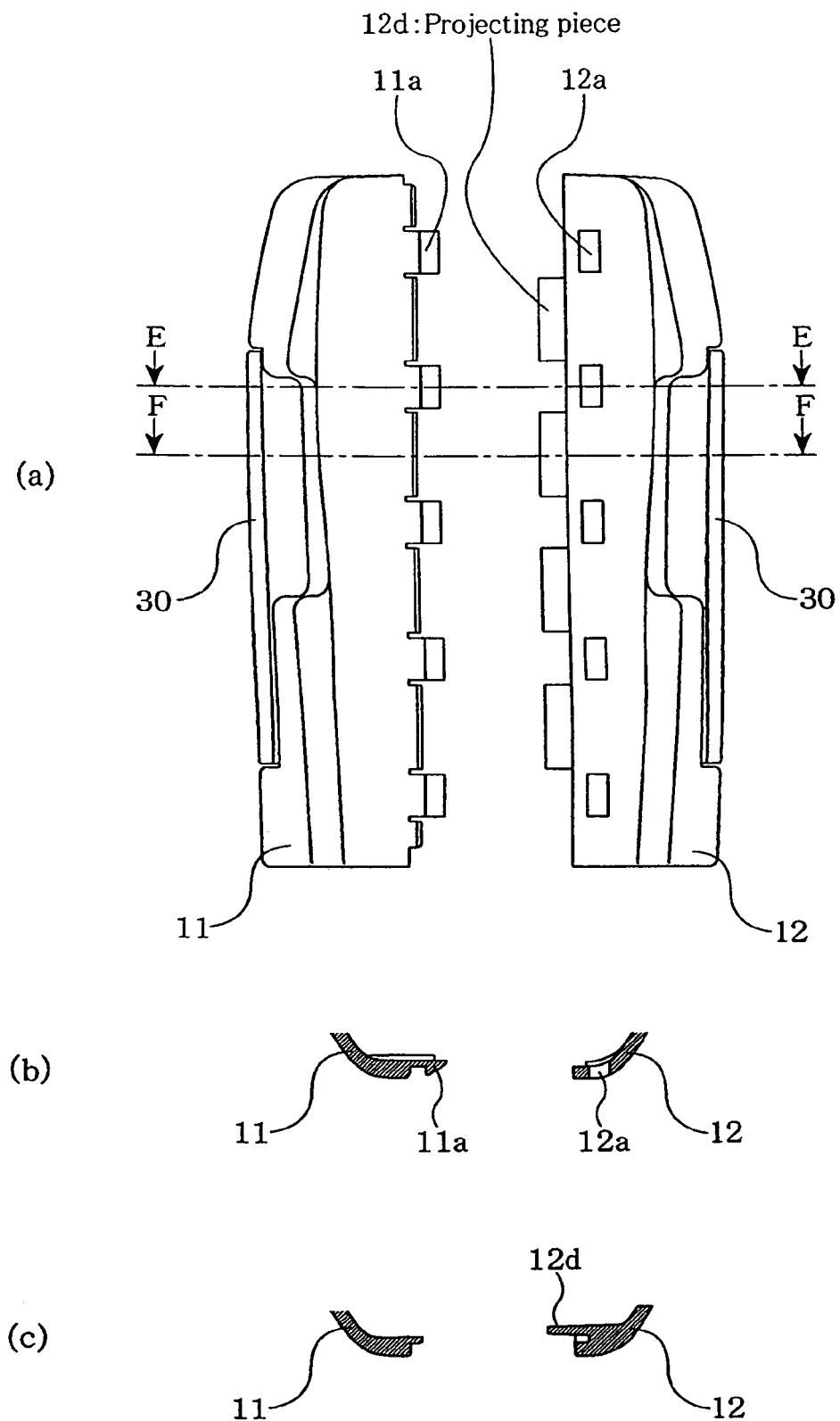

FIGS. 15(*a*) to 15(*c*) are explanatory views of the condition of another example of a holder when it is divided into a frontside member and a backside member.

Figure 16:
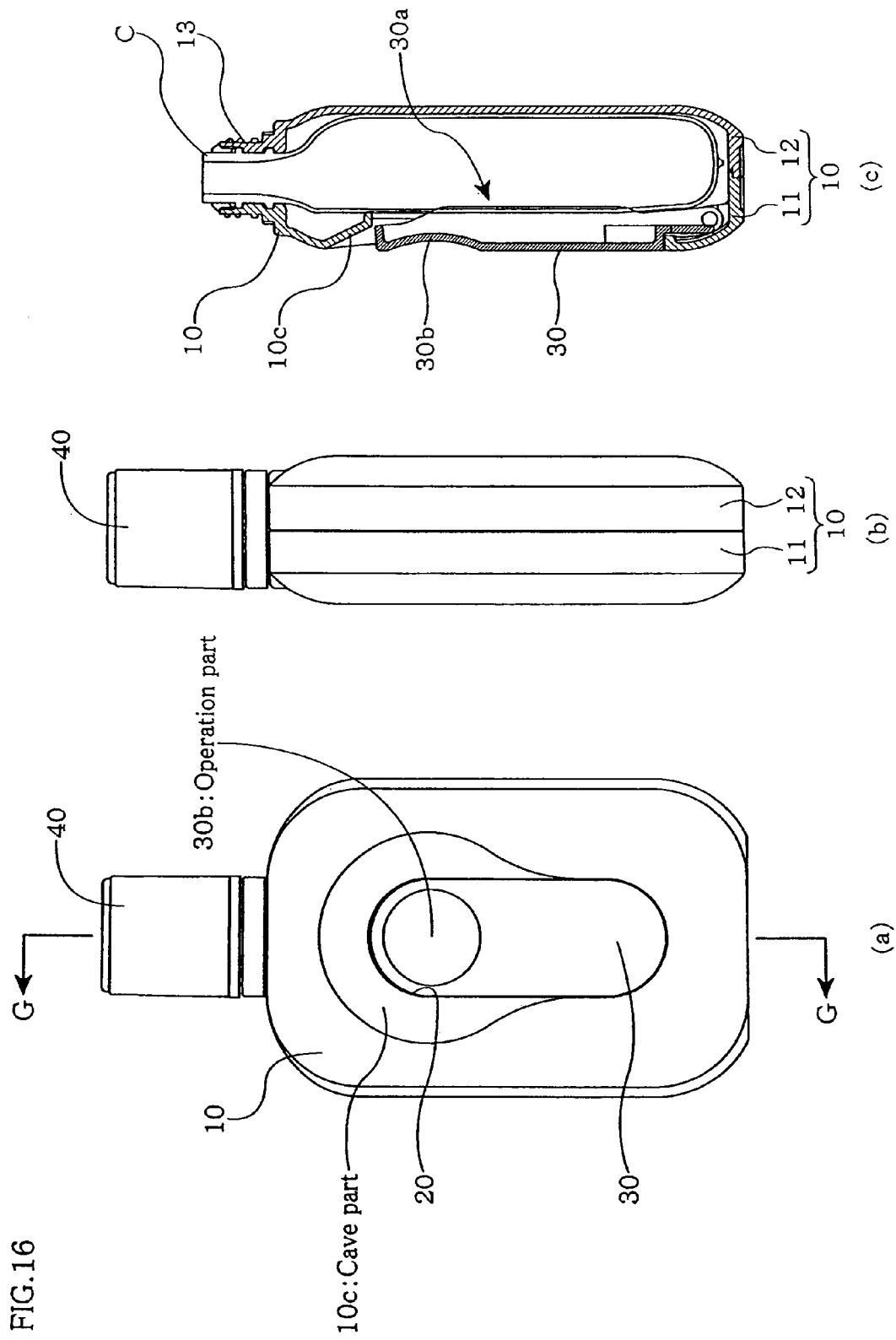

FIGS. 16(*a*) to 16(*c*) are explanatory views showing the outline of a second embodiment of a holder.

Figure 17:
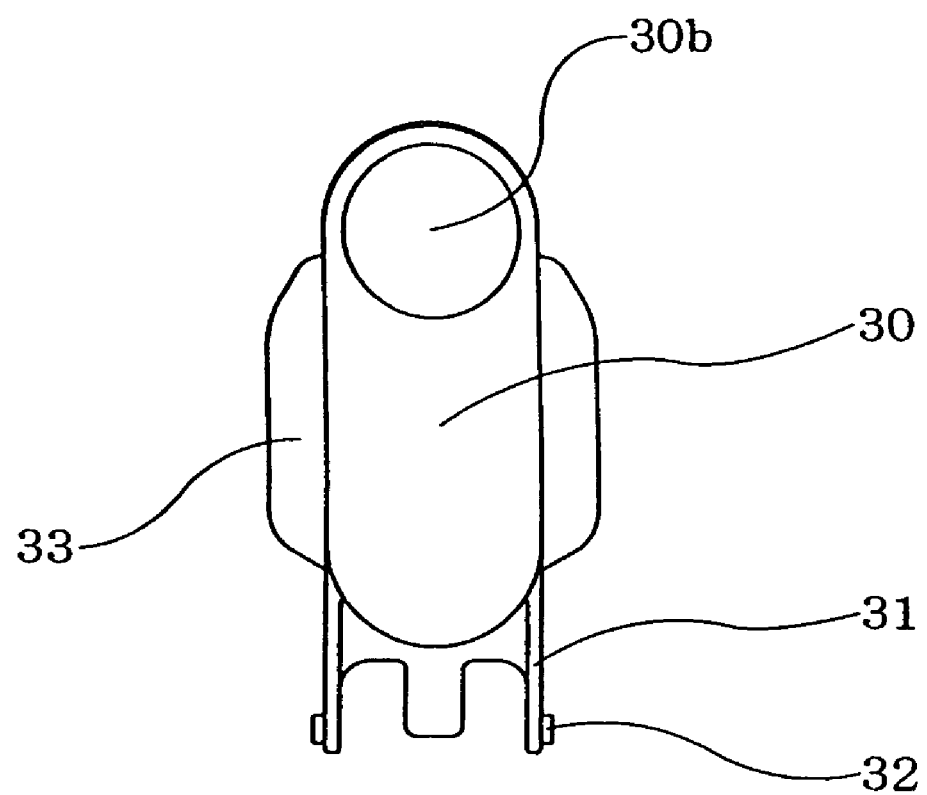

FIG. 17 is an explanatory view showing the outline of a lever in a second embodiment of a holder.

Figure 18:
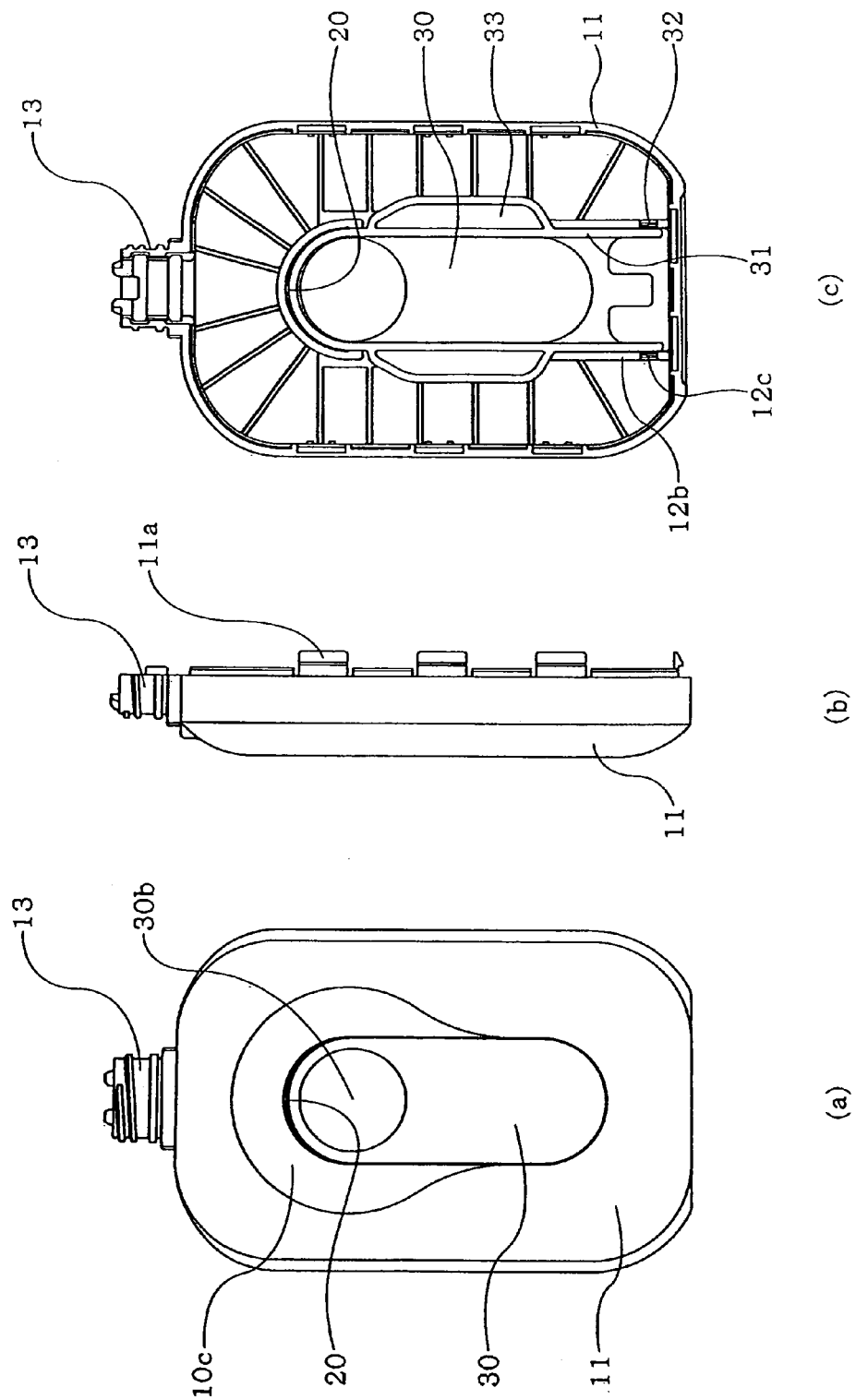

FIGS. 18(*a*) to 18(*c*) are explanatory views showing the outline of a frontside member in a second embodiment of a holder.

Figure 19:
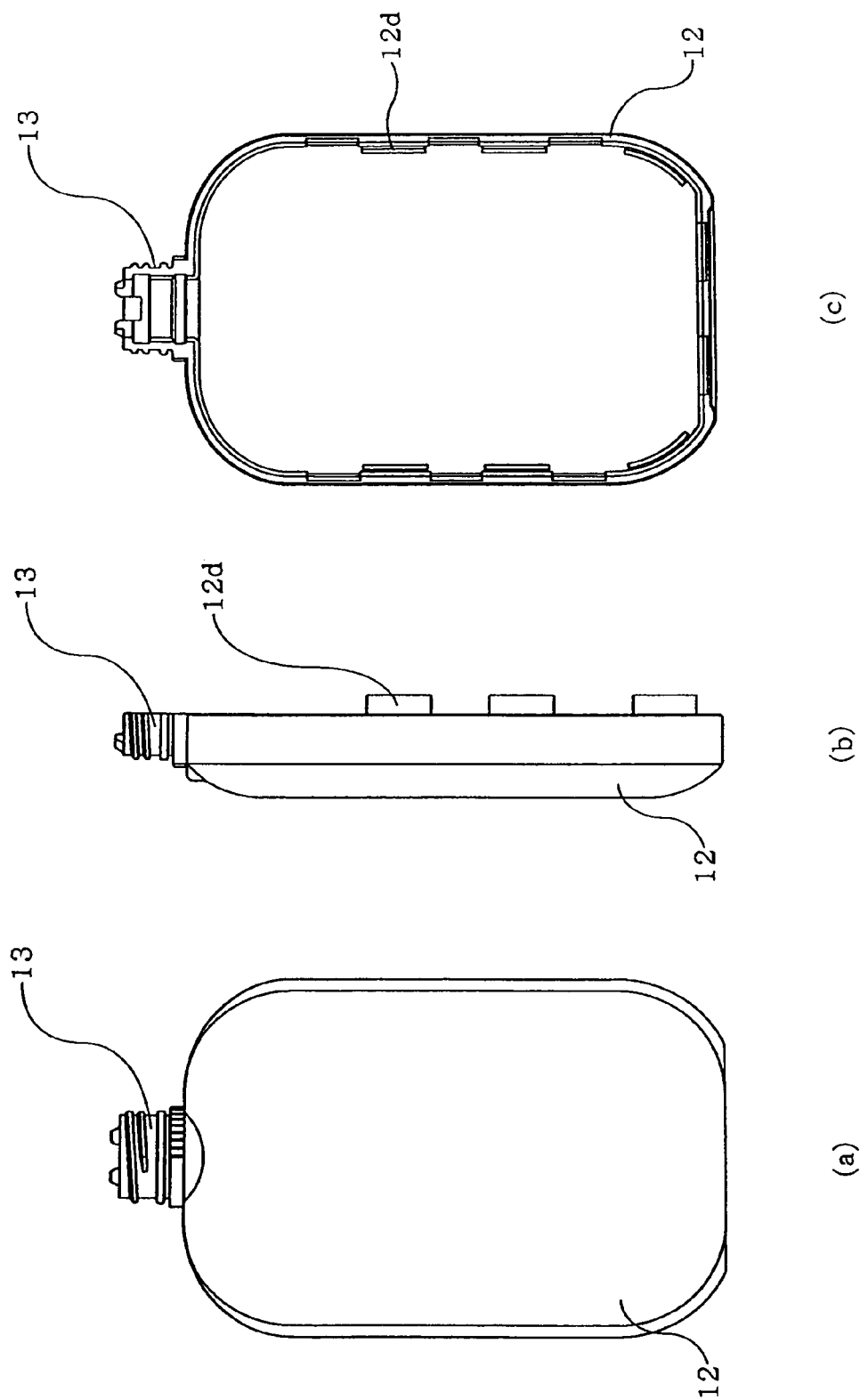

FIGS. 19(*a*) to 19(*c*) are explanatory views showing the outline of a backside member in a second embodiment of a holder.

Figure 20:
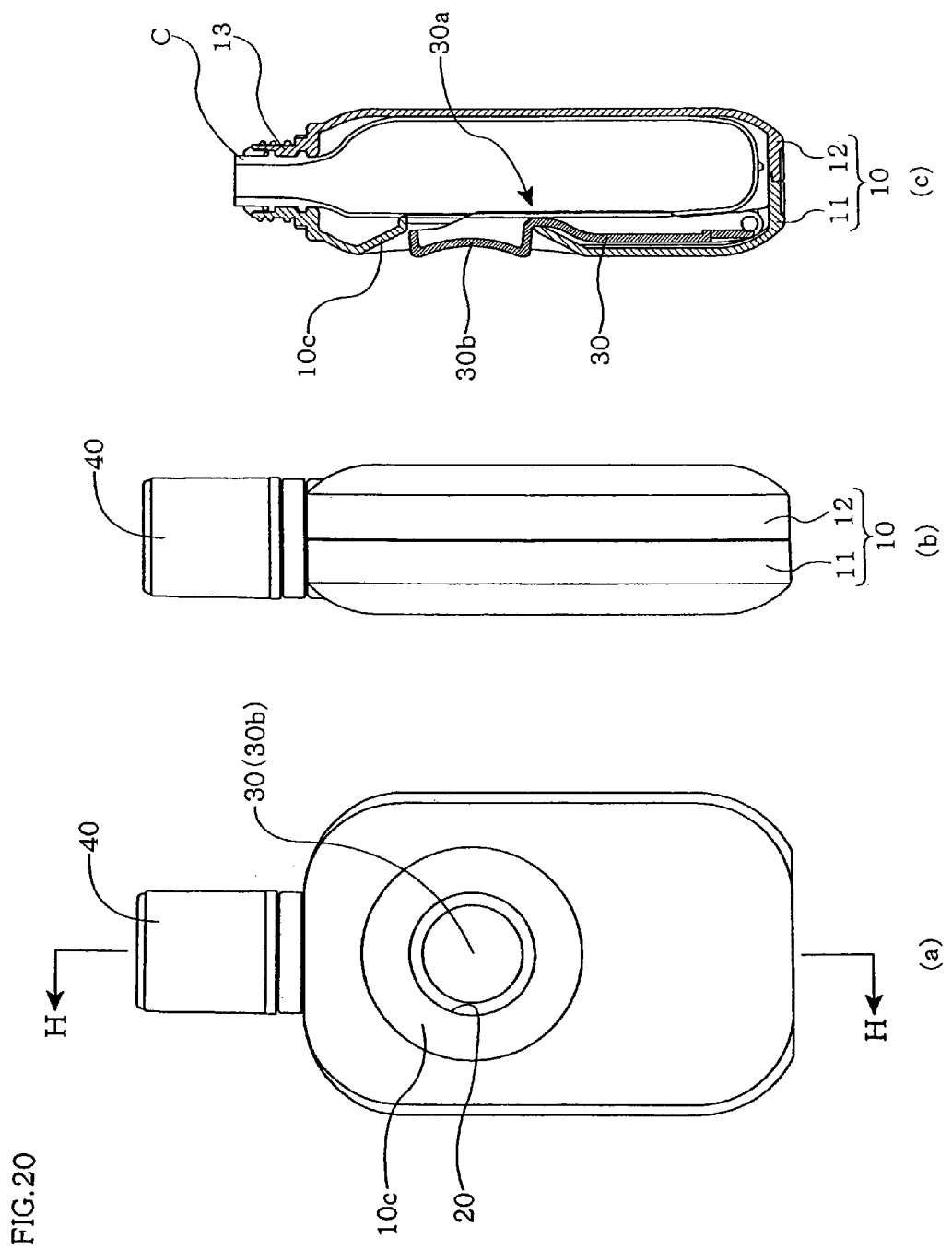

FIGS. 20(*a*) to 20(*c*) are explanatory views showing an example of a modification of a second embodiment of a holder.

DESCRIPTION OF THE PREFERRED EMBODIMENTS

Preferred embodiments of the present invention will be explained with reference to drawings.

However, it is needless to say that the present invention is not limited to the embodiments explained below and various modifications are possible within the scope of the present invention.

(Refueling Container for Fuelcell, Method for Refuelling)

First, a refuelling container for fuelcell and a method for refuelling according to the present invention will be explained.

Figure 1:
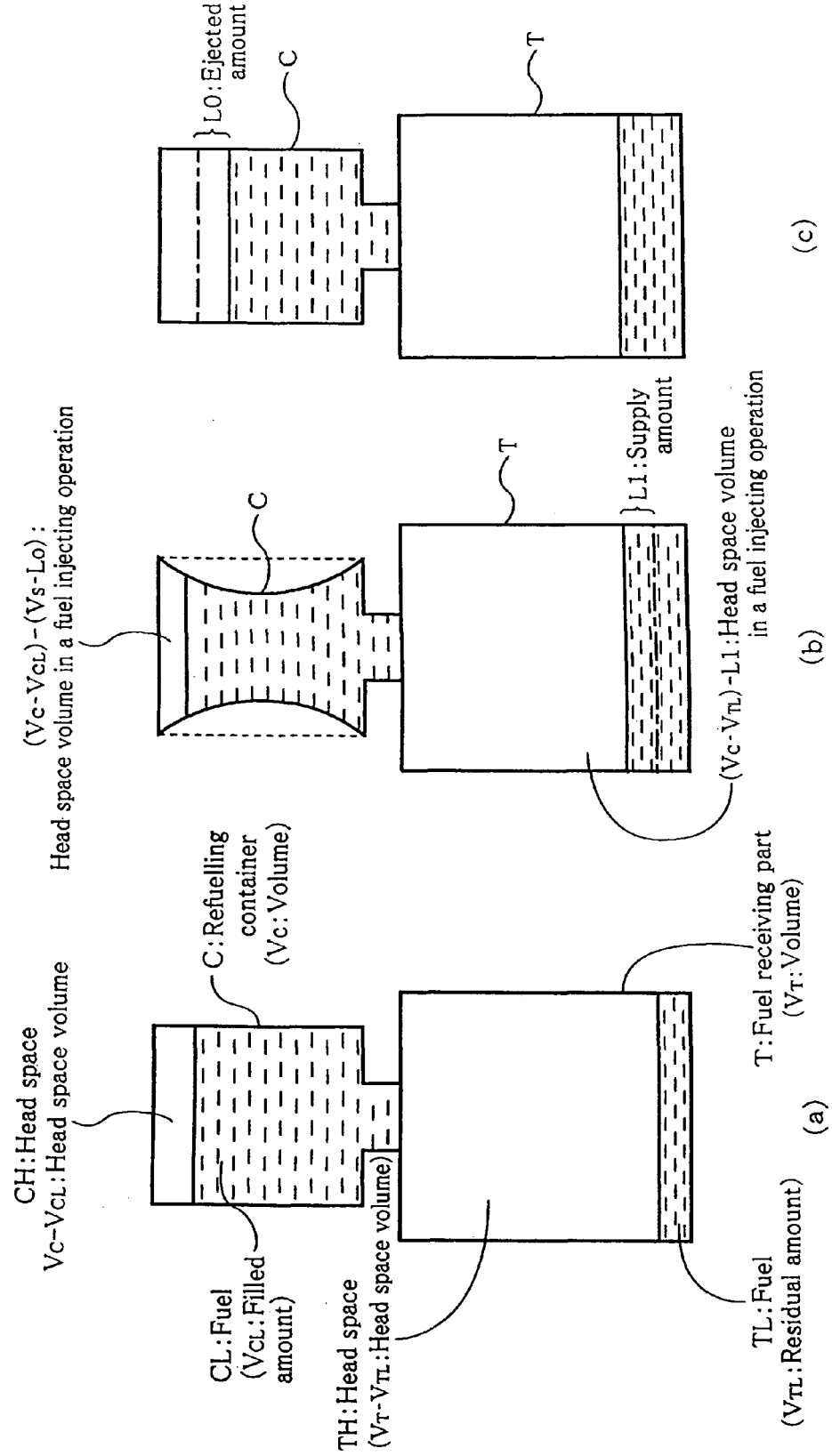

FIGS. 1(*a*) to 1(*c*) are explanatory views conceptually showing one cycle of a fuel injecting operation for injecting and supplying fuel from the outside to a fuel receiving part T of a fuelcell body by a refuelling container for fuelcell according to the present invention.

In an example shown in FIGS. 1(*a*) to 1(*c*), a refueling container C is joined with the fuel receiving part T in a dismountable manner while keeping airtight communication with the fuel receiving part T when injecting and supplying fuel to the fuel receiving part T of the fuelcell body from the outside. Then, the refuelling container C squeezes and reduces its volume to inject a fuel (content solution) CL such as methanol in a predetermined amount into the fuel receiving part T (see, for example, FIG. 1(*b*)) and then, the volume of the refuelling container C is restored to thereby absorb the atmospheric gas in the fuel receiving part T (see FIG. 1(*c*)).

If the volume of the fuel injected into the fuel receiving part T is too large when such a fuel injecting operation is carried out, the pressure in the fuel receiving part T is increased. This arouses a fear that an electromotive part (not shown) constituted of electrodes and an electrolyte film disposed adjacent to the fuel receiving part T is damaged. For this, in this embodiment, the refuelling container C is designed corresponding to the volume of the fuel receiving part T and the pressure in the fuel receiving part T to which the electromotive part can stand, that is, allowable pressure in the fuel receiving part T.

Specifically, the refuelling container C may be designed as follows.

First, when the volume of the fuel receiving part T is $V_T$ and the amount of a fuel TL in the fuel receiving part T just before a fuel injecting operation is $V_{TL}$, the volume (head space amount in the fuel receiving part T) occupied by the atmospheric gas in the fuel receiving part T is $(V_T - V_{TL})$ (see FIG. 1(*a*)). Also, when the amount of the fuel (supply amount) to be injected into the fuel receiving part T by one fuel injecting operation is L1, the head space amount in the fuel receiving part T when the fuel is injected is $(V_T - V_{TL} - L1)$ (see FIG. 1(*b*)).

Therefore, when the pressure in the fuel receiving part T is equal to the atmospheric pressure P before a fuel injecting operation and the atmospheric gas may be approximated to ideal gas, the pressure Pt in the fuel receiving part T when the fuel is injected is given by the following equation (3) based on Boyle's Law.

$$Pt = P \times (V_T - V_{TL})/(V_T - V_{TL} - L1) \quad (3)$$

On the other hand, when the volume of the refuelling container C is $V_c$ and the amount of a fuel CL in the refuelling container C just before a fuel injecting operation is $V_{CL}$, the volume (head space amount in the refuelling container C) occupied by the atmospheric gas in the refuelling container C before a fuel injecting operation is performed is $(V_c - V_{CL})$ (see FIG. 1(*a*)). Also, when the amount of the fuel (ejected amount) to be ejected from to the refuelling container C by one fuel injecting operation is L0 and the shrunk and reduced volume of the refuelling container C when the fuel is injected is Vs, the head space amount in the fuel receiving part T in the fuel injecting operation is $((V_c - V_{CL}) - (Vs - L0))$ (see FIG. 1(*b*)).

Therefore, when the pressure in the refuelling container C is equal to the atmospheric pressure P before a fuel injecting operation and the atmospheric gas may be approximated to ideal gas, the pressure Pc in the refuelling container C is given by the following equation (4) in the fuel injecting operation like the above based on Boyle's Law.

$$Pc = P \times (V_c - V_{CL})/((V_c - V_{CL}) - (Vs - L0)) \quad (4)$$

Then, the pressure Pt in the fuel receiving part T and the pressure Pc in the refuelling container C in the fuel injecting operation are in a pressure equilibrium (Pt=Pc) relation and the relation given by the following equation (5) is established.

$$P \times (V_T - V_{TL})/(V_T - V_{TL} - L1) = \\ P \times (V_C - V_{CL})/((V_C - V_{CL}) - (Vs - L0)) \quad (5)$$

Next, this equation (5) is rearranged to obtain the following equation (6).

$$L1 \times (V_c - V_{CL})/(V_T - V_{TL}) = Vs - L0 \quad (6)$$

Here, the supply amount L1 is equal to the ejected amount L0. Therefore, if substituting L0 in the above equation (6) for L1 and dividing both sides of the equation (6) by L1, the following equation (7) is obtained.

$$(V_c - V_{CL})/(V_T - V_{TL}) = Vs/L1 - 1 \quad (7)$$

Also, solving this equation (7) for L1, the following equation (8) is obtained.

$$L1 = Vs \times (V_T - V_{TL})/(V_c - V_{CL} + V_T - V_{TL}) \quad (8)$$

From the above, if the equation (3) is rearranged by substituting the equation (8) for L1 in the above equation (3), the pressure Pt in the fuel receiving part T in the fuel injection operation is given by the following equation (9).

$$Pt = P \times (V_c - V_{CL} + V_T - V_{TL})/(V_c - V_{CL} + V_T - V_{TL} - Vs) \quad (9)$$

Therefore, in order that the pressure Pt in the fuel receiving part T in the fuel injecting operation does not exceed the allowable pressure Ptf in the fuel receiving part T, that is, the equation Pt≦Ptf is established, it is only required that the refuelling container C is designed in the range where the following equation is established.

$$(V_c - V_{CL} + V_T - V_{TL})/(V_c - V_{CL} + V_T - V_{TL} - Vs) \leq Ptf/P \quad (1)$$

Here, the amount $V_{TL}$ of the fuel TL in the fuel receiving part T just before the fuel injecting operation and the amount $V_{CL}$ of the fuel CL in the refuelling container C just before the fuel injecting operation may be various values corresponding to assumed working situations. For example, the residual amount of the fuel TL is $V_{TL}$ when it is necessary to refuel to the fuel receiving part T because the fuel in the fuel receiving part T is consumed and the initial amount of the fuel CL to be filled in the refuelling container C is $V_{CL}$.

Also, in the case of intending to refuel from the refuelling container C keeping the fuel in the initial amount in the situation where the fuel in the fuel receiving part T is not almost consumed from the target receiving amount, the pressure Pt in the fuel receiving part T is the highest. Therefore, the above equation (1) may be applied on the assumption of this situation.

In this embodiment, if the refuelling container C is designed so as to fulfill the above equation (1), the pressure in the fuel receiving part T is kept at lower than a fixed pressure so as not to exceed the allowable pressure Ptf in the fuel receiving part T when injecting the fuel into the fuel receiving part T of the fuelcell body, whereby it is possible to limit the load on the electromotive part of the fuelcell and therefore the electromotive part can be efficiently prevented from being damaged.

Also, as mentioned above, the refuelling container C squeezes and reduces its volume to inject the fuel CL into the fuel receiving part T, and then, the volume is restored to its original state to absorb the atmospheric gas in the fuel receiving part T. Accordingly, this embodiment enables a continuous fuel injecting operation without any hindrance to the injection of the fuel when the fuel CL filled in the refuelling container C is injected in several lots into the fuel receiving part T.

In the meantime, when the refuelling container C is designed so as to satisfy the above equation (1) and the fuel is continuously injected in several lots such that the pressure in the fuel receiving part T in the fuel injecting operation is kept at lower than a fixed level, the number of the operations is preferably as small as possible. In this embodiment, the refuelling container C may be so designed that the above equation (1) is satisfied and the number of fuel injecting operations required until the amount of the fuel to be received in the fuel receiving part T reaches the target amount Vf is reduced.

Specifically, the supply amount L1 of the fuel injected into the fuel receiving part T by one fuel injection operation is given by the equation (8) as mentioned above. Therefore, when the amount of the fuel in the fuel receiving part T just before the ith fuel injecting operation is $V_{TL}i$ and the amount of the fuel in the refuelling container C just before the ith fuel injecting operation is $V_{CL}i$, the supply amount Li of the fuel injected into the fuel receiving part T by the ith fuel injecting operation is given by the following equation (10).

$$Li = (V_T - V_{TL}i) \times Vs/(V_c - V_{CL}i + V_T - V_{TL}i) \quad (10)$$

Therefore, if the refuelling to the fuel receiving part T is completed by carrying out fuel injecting operations X times, the difference obtained by subtracting the amount of the fuel remaining in the fuel receiving part T when the fuel injecting operation is started, that is, the amount $V_{TL}$ of the fuel in the fuel receiving part T just before the fuel injecting operation, from the target amount Vf of the fuel to be received in the fuel receiving part T is equal to the sum of the fuel injected into the fuel receiving part T by carrying out fuel injecting operations X times and the following equation (2) is established.

$$Vf - V_{TL} = \sum_{i=1}^{x} ((V_T - V_{TL}i) \times Vs/(V_c - V_{CL}i + V_T - V_{TL}i)) \quad (2)$$

Here, i is an integer from 1 to 10.

It is possible to design the refuelling container C so as to reduce the number of fuel injecting operations necessary for the fuel in the fuel receiving part T to reach the target amount Vf of the fuel received in the fuel receiving part T while the pressure in the fuel receiving part T is kept at lower than a fixed level by defining the number of fuel injecting operations based on the minimum value of X that satisfies the above equation (2) in the range where the above equation (1) is established.

Here, each initial value of $V_{TL}i$ and $V_{CL}i$, that is, $V_{TL}i$ (=$V_{TL}$) and $V_{CL}i$ ($V_{CL}$) of i=1 may be various values corresponding to assumed working situations. Under this situation, the number of fuel injecting operations is the largest in the case of intending to start a fuel injecting operation when the residual amount of the fuel in the fuel receiving part T is almost zero and the amount of the fuel filled in the refuelling container C is slightly exceeding the target amount Vf of the fuel to be received in the fuel receiving part T. It is therefore preferable to apply the above equation (2) in this situation.

When the fuel is further injected when the fuel is fully filled in the fuel receiving part T, the pressure in the fuel receiving part T is excessive whether the above equation (1) is established or not. Therefore, it is preferable to design that the target amount Vf of the fuel to be received in the fuel receiving part T is less than the volume $V_T$ of the fuel receiving part T and is specifically, preferably about 80% of the volume $V_T$ of the fuel receiving part T.

In this embodiment, there is no particular limitation to the specific shape and dimension of the refuelling container C insofar as they satisfy the above equations (1) and (2). Usually, the refuelling container C is designed to have a bottle-like structure provided with a mouth part C1, a body part C2 and a bottom part C3. Then, the mouth part C1 of the refuelling container C is fitted with a coupler 1 provided with a fuel ejecting port 1a projecting towards the top side (see FIGS.

2(a) and 2(b)). This fuel ejecting port 1a is inserted into and engaged with the fuel injecting port of the fuel receiving part T to thereby join the refuelling container C with the fuel receiving part T in a dismountable manner while keeping airtight communication with the fuel receiving part T. It is thereby possible to carry out a fuel injecting operation as mentioned above in this state.

At this time, a valve mechanism as shown in FIGS. 13 and 14 may be used to maintain airtightness with the fuel receiving part T.

Here, FIG. 13 is an explanatory view conceptually showing an example of a valve mechanism which joins the refuelling container C with the fuel receiving part T while keeping airtight communication of the both, showing a schematic sectional view of the valve mechanism provided on the fuel ejecting port 1a of the refuelling container C side and a schematic sectional view of the valve mechanism provided on the fuel injecting port 2 of the fuel receiving part T side. Also, FIG. 14 shows the situation where the fuel ejecting port 1a of the refuelling container C side is inserted into and engaged with the fuel injecting port 2 of the fuel receiving part T side.

When, in the illustrated example, the fuel ejecting port 1a of the refuelling container C side is inserted into the fuel injecting port 2 of the fuel receiving part T side, a valve body 1b of the refuelling container C side and a valve body 2a of the fuel receiving part T side are eventually brought into contact with each other and pressed against each other. Usually, the biasing force of a spring 2c biasing the valve body 2a of the fuel receiving part T side is designed to be lower than the biasing force of a spring 1d biasing the valve body 1b of the refuelling container C side. Therefore, the valve body 2a in the fuel receiving part T side leaves a valve sheet 2b first to disengage the valve mechanism of the fuel receiving part T side. At this time, the airtight condition in the fuel receiving part T can be kept by interposing a proper seal member (not shown) between the fuel ejecting port 1a of the refuelling container C side and the fuel injecting port 2 of the fuel receiving part T side so as to engage the both with each other air-tightly.

Then, when the fuel ejecting port 1a of the refuelling container C side is pushed more into the fuel receiving side, the valve body 1b of the refuelling container C side leaves the valve seat 1c to disengage the valve mechanism of the fuel supply C side. This ensures that the fuel receiving part T is communicated with the refuelling container C while keeping airtight condition. The fuel CL in the refuelling container C can be injected into the fuel receiving part T by carrying out the aforementioned fuel injecting operation.

If a proper engaging means is provided between the refuelling container C and the fuel receiving part T though not illustrated specially, the continuous fuel injecting operation can be carried out while the condition that the refuelling container C is joined with the fuel receiving part T is kept with ease.

The refuelling container C as mentioned above may be obtained by using a synthetic resin material including an olefin type resin such as high-density polyethylene (HDPE), low-density polyethylene (LDPE), linear low-density polyethylene (LLDPE), polypropylene (PP) or cyclic olefin (COC), a copolymer or blended resin of these resins, polyester resin such as polyethylene terephthalate (PET), polyethylene naphthalate (PEN) or polylactic acid (PLA) or a copolymer or blended resin of these resins, and by molding the synthetic resin material into a predetermined shape by a proper means such as direct blow molding or biaxial oriented blow molding. In this case, it is preferable to use a material having transparency so that the residual amount of the fuel CL in the refuelling container C can be seen visually. Also, it is preferable to form the refuelling container C by molding using, among the above resin materials, a flexible material which easily squeezes and reduces the volume and restores its original volume in the fuel injecting operation.

Also, the refuelling container C to be formed by molding using such a synthetic resin material may be designed to have not only a single-layer structure but also a multilayer structure.

When the refuelling container C is designed to have a multilayer structure, at least the innermost layer is preferably formed using the above synthetic resin material. Also, functional resin layers formed of a resin (for example, a cyclic olefin or polyamide resin) having a barrier function against the fuel or an adhesive resin and a regrind layer may be formed as intermediate layers.

(Holder for Fuel Container)

Next, a preferred embodiment of a holder for refuelling container according to the present invention will be explained.

Figure 2:
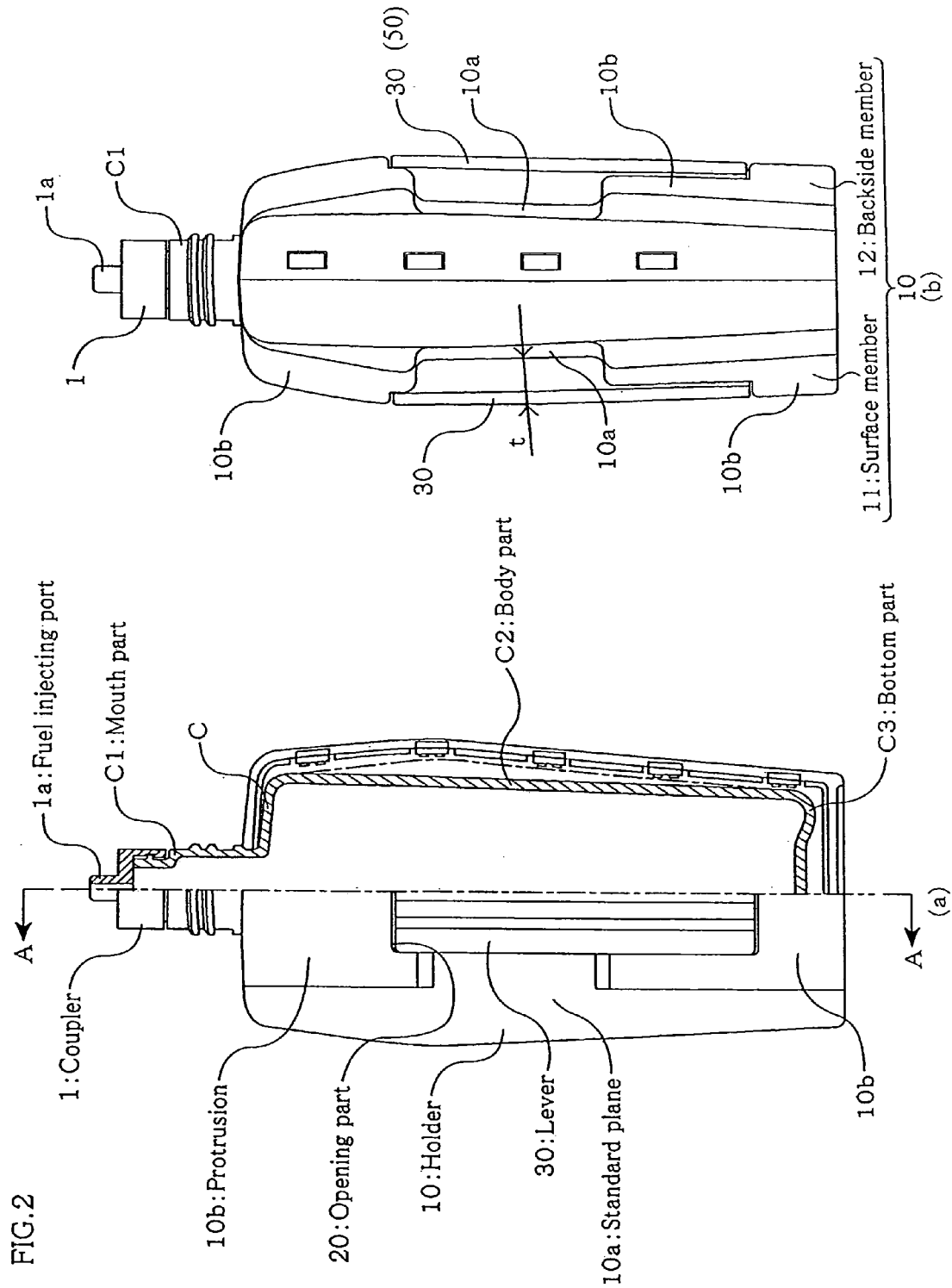

In this embodiment, the refuelling container C is received in a holder 10 made of a rigid material as shown in FIGS. 2(a) and 2(b) taking its portability into account. This efficiently avoids such a disorder that when the refuelling container C is put into a bag and carried, it is, for instance, crushed in the bag, resulting in the leakage of fuel, and it is therefore possible to raise safety when the refuelling container C is carried. This embodiment is particularly effective when the refuelling container C is formed by molding using a flexible material.

Hereinafter, first embodiment and second embodiment of the folder for refuelling container according to the present invention are described.

First Embodiment

Figure 3:
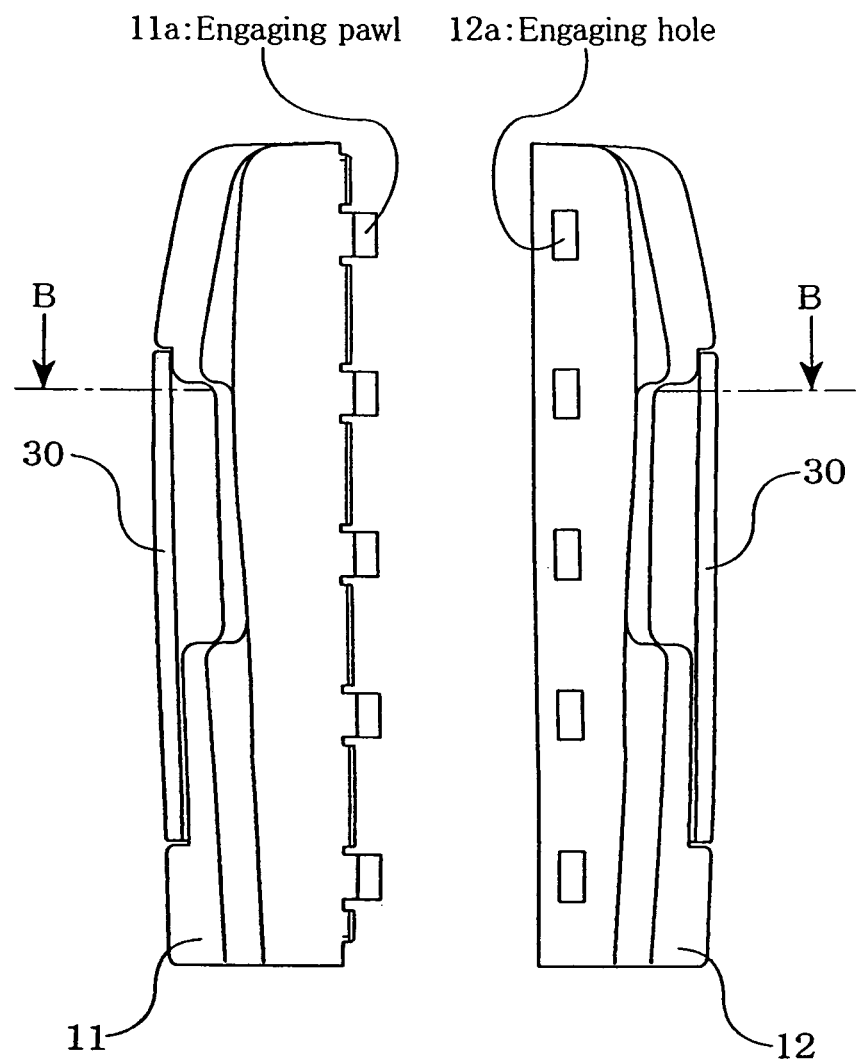
FIG. 3 is an explanatory view of the condition of a holder when it is divided into a frontside member and a backside member.
Figure 4:
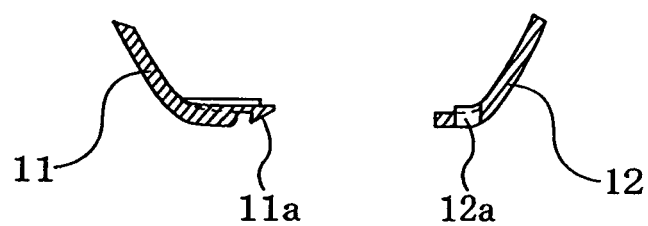
FIG. 4 is a sectional view along the line B-B in FIG. 3.

With regard to the first embodiment of the holder for refuelling container according to the present invention, FIG. 2(a) is a partially cutway and front view showing the condition of the holder 10 in which the refuelling container C is received and FIG. 2(b) is a side view showing the condition of the holder 10 in which the refuelling container C is received. Also, FIG. 3 shows the condition that the holder 10 is divided into a frontside member 11 and a backside member 12 and FIG. 4 is sectional view of an essential part along the line B-B in FIG. 3.

In the example shown in these drawings, the holder 10 is constituted of the frontside member 11 and backside member which are obtained by dividing the holder 10 in a vertical direction. An engaging pawl 11a provided on the frontside member 11 side is engaged with an engaging hole 12a provided on the backside member 12 side to receive the refuelling container C between the frontside member 11 and backside member 12 which are to be integrated.

The frontside member 11 and the backside member 12 constituting the holder 10 are provided with an opening part 20 in each center of these members and a lever 30 rotatable towards the inside of each of these members 11 and 12 is fitted to the opening part 20 on a pivot of the lower end side. The lever 30 fitted in this manner functions as an operation part for carrying out the aforementioned fuel injecting operation: specifically, when pushing down the lever 30 by its rotating operation, a working part 30a of the lever 30 is in contact with the refuelling container C to squeeze and reduce the volume of the refuelling container C by the volume corresponding to the rotation of the lever 30, thereby functioning as the operation part to carry out the aforementioned fuel injecting operation (see, FIG. 6).

Figure 6:
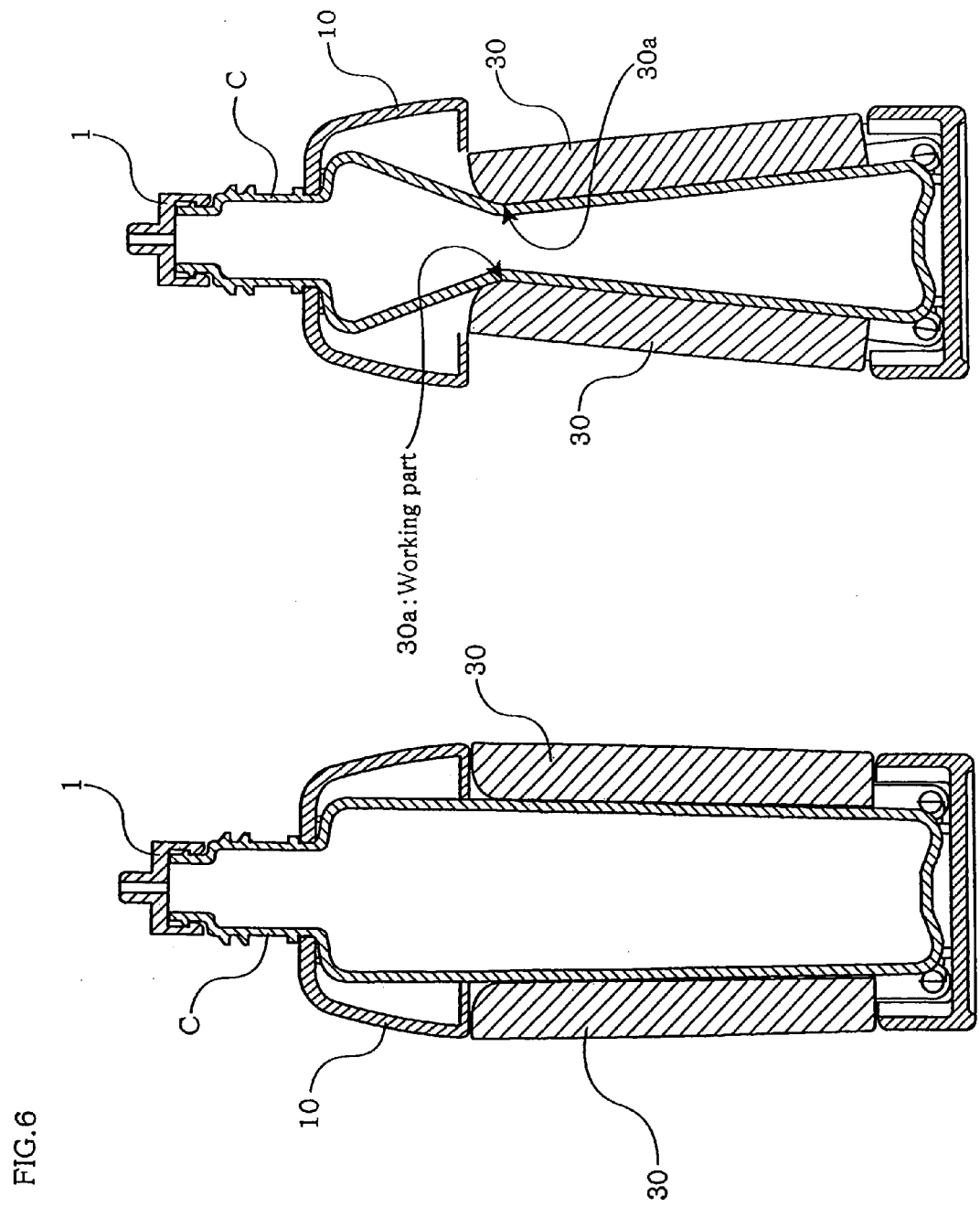
FIG. 6 is an explanatory view showing the movements of a lever in an operation of injecting fuel.

Here, FIG. 6 corresponds to the section along the line A-A shown in FIG. 2(a). Also, FIG. 6(a) shows the situation where the lever 30 is placed at a stationary position and FIG. 6(b) shows the situation where the lever 30 is pushed down. When the lever 30 is pushed down as shown in FIG. 6(b), the working part 30a of the lever 30 is pressed against the refuelling container C, whereby it is elastically deformed. Along with this, the refuelling container C is elastically deformed not only in the direction in which the lever 30 is pushed down but also in a direction perpendicular to the pushed-down direction as shown in the dotted line in FIG. 2(a). Therefore, the inner dimensions of the holder 10 is preferably designed taking the elastic deformation of the refuelling container C into account.

More specifically, it is preferable that the amount of reduction of the volume of the refuelling container C by reduction be optimized to find the deformation (usually, the refuelling container C is deformed in a direction perpendicular to the pushed-down direction of the lever 30) of the refuelling container C when a fuel injecting operation corresponding to this optimum amount of reduction is carried out, thereby designing the inner dimensions of the holder 10 so as to afford a margin enough to absorb the deformation.

Also, when the refuelling container C is received in the holder 10 like this, the refuelling container C is preferably received in the holder 10 such that a body part C2 of the refuelling container C has an elliptical form as a horizontal section and also, the lever 30 is preferably disposed facing the plane along the direction of the major diameter of the body part.

Such a structure ensures that because the plane along the direction of the major diameter of the body part C2 of the refuelling container C is thinner than the plane along the minor diameter in the molding when the refuelling container C is formed by molding using the above means, the volume of the fuel container C is easily reduced by reduction and it is therefore possible to regulate the reduced amount if the working part 30a of the lever 30 is pressed against this thinner side plane to deform the refuelling container C elastically.

Figure 5:
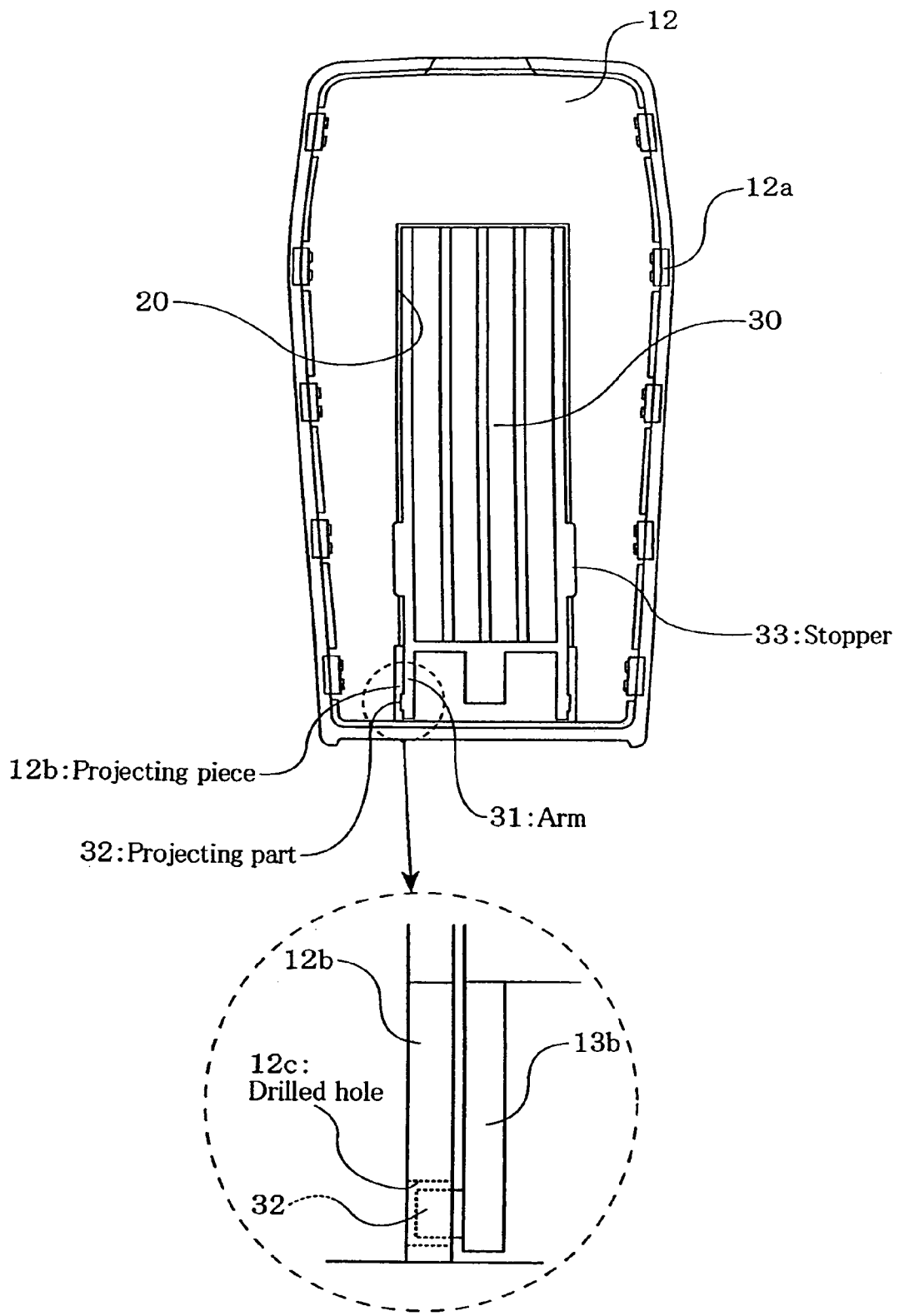
FIG. 5 is an explanatory view showing the fitted condition of a lever as viewed from the inside of the backside member.

Also, as shown by the fitted condition of the lever 30 as viewed from the inside of the backface member 12 in FIG. 5, the lever 30 in this embodiment is provided with an arm 31 extending towards the lower end side. Then, as shown by an enlarged part enclosed by the dotted line in the figure, a projecting part 32 provided at the end side of the arm 31 is penetrated through a drilled hole 12c of a projecting piece 12b provided on the backside member 12 so that the lever 30 is rotatable around the backside member 12.

In the illustrated example, the lever 30 is fitted such that the rotating pivot is positioned at the lower end side. However, the rotating pivot may be positioned at the upper end side and there is no particular limitation to a specific fitting means insofar as the lever 30 functions as the working part for carrying out the fuel injecting operation.

When the power pushing down the lever 30 is released, the refuelling container C restores its original volume by its elastic force and the internal pressure of the head space, whereby the lever 30 is forced back to the stationary position. At this time, if a clearance is produced between the edge of the working part 30a side of the lever 30 and an opening part 20, such disorders are considered that foreign matter is intermingled in the clearance and the fingers of users are caught in this clearance when the lever 30 is again pushed down to repeat the fuel injecting operation.

Therefore, the lever 30 is provided with a stopper 33 that is in contact with the edge part of the opening part 20 from the inside to thereby limit the rotating range of the lever 30 directed to the outside of the backside member 12, thereby preventing a clearance from being produced between the end edge of the working part 30a of the lever 30 and the opening part 20. Also, it is designed that even if, for example, the refuelling container C is swelled under a high-temperature environment, the lever 30 is not projected towards the outside.

Although not particularly illustrated, the lever 30 is likewise fitted to the frontside member 11.

Also, in this embodiment, the frontside member 11 and the backside member 12 may be provided with a protrusion 10b which partially encloses the side surfaces of the upper end side and lower end side of the lever 30 and is formed such that it is protruded from a standard plane 10a so as to be disposed on the same flat as the operating plane of the lever 30 on each upper and lower sides. This limits the operating range of the lever 30 to the center part where the lever 30 is easily operated to thereby prevent the lever 30 from being pushed down carelessly when it is carried in a bag and the like or erroneously dropped.

Therefore, in the illustrated example, a user can carry out a fuel injecting operation by pushing down the operating plane of the center part of the lever 30, for example, so as to clip the operating plane by the thumb and forefinger.

If the operating range of the lever 30 is limited to the center part of the lever 30 where the lever 30 is easily operated, the protrusion 10b may be formed so as to protrude from the operating plane of the lever 30.

Also, the holder 10 may be provided with a limiting mechanism 50 that prevents a reduction in the volume of the refuelling container C from exceeding a fixed level when the lever 30 is pushed down to carry out the fuel injecting operation. Although no particular limitation is imposed on the specific structure of the limiting mechanism 50 for example, amount of the lever 30 which can be pushed down is controlled and specifically, a difference t between the operating plane of the lever 30 and the standard plane 10a is properly adjusted to limit the amount of the lever 30 to be pushed down to lower than a fixed level, thereby preventing the reduction in the volume of the refuelling container C from exceeding a fixed level.

With the limiting mechanism 50, it can prevent damages to the electromotive part more exactly because the reduction of the volume Vs of the refuelling container C by reduction in the fuel injecting operation is fixed and in other words, the amount of the fuel to be injected into the fuel receiving part T of the fuelcell body is fixed by the provision of the limiting mechanism 50.

Even in the case where a user directly squeezes the refuelling container C by the fingers to carry out a fuel injecting operation, the reduction of the volume Vs of the refuelling container C when the fuel is injected can be fixed by controlling the shape of the refuelling container C and the degree of the deformation of the supply container C. However, if the holder is provided with the aforementioned limiting mechanism 50, the reduction Vs of the volume of the refuelling container C when the fuel is injected can be fixed more exactly.

Also, though the width of the lever 30 may be optionally set, it is preferable to make the width W of the lever 30 narrow (for example, 13 mm or less) as shown in FIG. 8 such that when the lever 30 is pushed down, the fingers of a user stick out of the operating plane of the lever 30 and touch the standard plane 10a when the lever 30 is pushed through so that the lever 30 is not more pushed down. The reduction in the volume Vs of the refuelling container C when the fuel is injected can be fixed still more exactly.

Also, the lever 30 as the operational part may be provided on only one surface of the holder 10 as shown in FIGS. 7(a) and 7(b). Such a aspect has the advantage that the attitude of the holder 10 can be stabilized in the fuel injecting operation and also, the other surface of the holder 10 may be utilized as a space used to print or apply notes such as instructions before use.

Also, in this embodiment, screw threads may be formed on the mouth part C1 of the refuelling container C to screw-fit a cap 40 to the mouth part C1. As the cap 40 to be screw-fitted to the mouth part C1, one having a child resistance function is preferably used to prevent, for example, a child from taking off the cap carelessly. As the cap 40 having a child resistance function, one having a double structure constituted of an outside cap as shown in FIGS. 9(a) to 9(c) and an inside cap as shown in FIGS. 10(a) to 10(c) may be given as one example.

FIGS. 9(a) to 9(c) are explanatory views of an outside cap 41, wherein FIG. 9(a) is a front view of the outside cap 41, FIG. 9(b) is a sectional view along the line C-C in the FIG. 9(a) and FIG. 9(c) is a bottom view of the outside cap 41. As shown in these figures, plural trailing pieces 41a are disposed along the peripheral direction inside of the top surface of the outside cap 41.

Also, FIGS. 10(a) to 10(c) re explanatory views of the inside cap 42, wherein FIG. 10(a) is a front view of the inside cap 42, FIG. 10(b) is a sectional view along the line D-D of FIG. 10(a) and FIG. 10(c) is a plan view of the inside cap 42. As shown in these figures, a thread groove is formed on the inside periphery of the inside cap 42. The cap 40 is screw-fitted to the mouth part C1 of the refuelling container C by this thread groove. A groove 42a sandwiched between the rise plane 42b and the slant plane 42c is formed on the upper surface of the inside cap 42. When the inside cap 42 is inserted into the outside cap 41, the trailing pieces 41a of the outside cap 41 is designed to enter into the groove part 42a of the inside cap 42.

Such the outside cap 41 and the inside cap 42 are designed that the inside cap 42 is relatively movable vertically and the inside cap 42 is not easily dismounted from the outside cap 41 by the sake of a loose stopper 41 b of the outside cap 41 and the engaging part 42d of the inside cap 42. As shown in FIGS. 11(a) to 11(c), in the case of only turning the cap in the direction of the arrow in the figure to dismount the cap 40 from the mouth part C1 of the refuelling container C, the trailing peace 41a of the outside cap 41 runs onto the slant plane 42c of the inside cap 42 side (see FIG. 11(b)) so that the outside cap 41 fails to engage with the outside cap 42 (see FIG. 11(c)).

The cap 40 is designed in the following manner. When the cap 40 is screw-fitted to the mouth part C1 of the refuelling container C on the contrary, the outside cap 41 is turned in the direction of the arrow in the figure as shown in FIGS. 12(a) and 12(b). Then, the trailing peace 41a of the outside cap 41 is brought into contact with the rise plane 42b of the inside cap 42 side (see FIG. 12(b)) and then the inside cap 41 is also rotated together with the outside cap 41. Thus, the cap 40 can be easily fastened.

In FIGS. 11 and 12, only one relevant trailing peace 41a is illustrated and is shaded.

On the other hand, in order to remove the cap 40 from the mouth part C1 of the refuelling container C, it is only required that downward force is applied to the outside cap 41 so that the outside cap 41 does not fail to engage with the inside cap 42, to turn the outside cap 41 with pressing the tip of the trailing piece 41a of the outside cap 41 against the slant plane 42c of the inside cap 42. By this procedure, the inside cap 42 is rotated together with the outside cap 41 and thus the cap 40 can be removed from the mouth part C1 of the refuelling container C.

Also, this embodiment is not limited to the aspect in which the cap 40 is screw-fitted directly to the mouth part C1 of the refuelling container C. As shown in FIGS. 7(a) and 7(b), a protective wall 13 that rises from the holder 30 in such a manner as to cover the mouth part C1 of the refuelling container C may be disposed to screw-fit the cap 40 to the screw thread formed on the protective wall 13.

Particularly, in the case of forming the refuelling container C by using a soft material having flexibility, it is difficult to secure the strength of the mouth part C1 against thread fastening of the cap 40. Therefore, such a aspect is preferable also to prevent the occurrence of such a phenomenon that the mouth part C1 of the refuelling container C is, for example, deformed so that the thread fastening of the cap 40 is hindered or the cap 40 is fallen out.

Moreover, when such a protective wall 13 is disposed, the joint part between the mouth part C1 of the refuelling container C and the coupler 1 is concealed by the protective wall 13 to make it difficult to remove the coupler 1. This prevents the coupler 1 from being carelessly removed from the mouth part C1 of the refuelling container C.

In this embodiment, the frontside member 11, backside member 12, lever 30 and cap 40 constituting the holder 10 may be respectively formed by molding into a predetermined shape by using synthetic resin materials such as an acrylonitrile-butadiene-styrene resin (ABS), polystyrene (PS), acrylonitrile-styrene resin (AS), polyethylene terephthalate (PET), polybutylene terephthalate (PBT), polyethylene naphthalate (PEN), polycarbonate (PC), polypropylene (PP), polyethylene (PE), polyacetal (POM), polymethylmethacrylate (PMMA) and modified polyphenylene ether (PPE) either singly or in combinations of two or more or by using complex materials obtained by adding thereto a filler such as glass fiber and talc according to the need to these synthetic resin materials. However, at least the lever 30 is preferably formed by molding using a highly transparent material whereby the state of the received refuelling container C, for example, the residual amount of the fuel in the refuelling container C can be observed visually. In general, among materials having high drop-impact resistance, few material have high transparency. It is therefore particularly preferable to form the lever 30 by using a highly transparent material when it is intended to visually observe the residual amount of the fuel in the refuelling container C while ensuring the drop-impact resistance of the holder 10.

Modification Example

The first embodiment of the holder for refuelling container according to the present invention has been explained above. Various modifications of this embodiment are possible as will be explained below.

For example, in the above embodiment, the refuelling container C is designed to be received in the holder 10 constituted of the frontside member 11 and backside member 12 obtained by dividing the container along a vertical direction. However, the structure of the holder 10 is not limited to the above structure. Though not particularly shown in the figure, the holder 10 may be a type that is divided along a horizontal direction and the refuelling container C may be received in such a holder.

Also, in the aforementioned embodiment, the engaging crawl 11a disposed on the frontside member 11 side is engaged with the engaging hole 12a formed on the backside member 12 side to thereby receive the refuelling container C between the frontside member 11 and backside member 12 which are integrated with each other. However, when methanol is filled as the fuel, it is necessary to prevent the refuelling container C from being easily removed from the holder 10 from the viewpoint of ensuring safety.

For this, for example, as shown in FIGS. 15(a) to 15(c), a projecting piece 12d to be inserted between the neighboring engaging crawls 11a disposed on the frontside member 11 side is disposed on the backside member 12 side and the frontside member 11 is deformed, so that the frontside member 11 and the backside member 12 can stand against the force releasing the engagement of the engaging crawl 11a with the engaging hole 12a to prevent the both from being easily separated from each other.

Here, FIG. 15(a) shows the situation where the holder 10 is divided into the frontside member 11 and the backside member 12, FIG. 15(b) is a sectional view of an essential part along the line E-E in FIG. 15(a) and FIG. 15(c) is a sectional view of an essential part along the line F-F in FIG. 15(a).

Also, though not particularly illustrated, the frontside member 11 and the backside member 12 can be prevented from being separated from each other with ease by using a structure in which the engaging crawls 11a and the engaging holes 12a are alternately provided on the frontside member 11 and the backside member 12 to engage these engaging crawls and holes with each other or the frontside member 11 and the backside member 12 are joined by bonding or welding.

Second Embodiment

Next, a second embodiment of the holder for refuelling container according to the present invention will be explained.

Here, FIGS. 16(a) to 16(c) are explanatory views showing the outline of the holder for refuelling container in this embodiment. FIG. 17 is a front view of a lever 30 in this embodiment. Also, in FIGS. 16(a) to 16(c), FIG. 16(a) is a front view of a holder 10 with a cap 40 screw-fitted thereto, FIG. 16(b) is a side view of the holder 10 and FIG. 16(c) is a sectional view along the line G-G of FIG. 16(a) showing the condition of the holder 10 from which the cap 40 is removed (however, the illustration of a coupler is not described). In the example shown in these drawings, the parts and members common to this embodiment and the first embodiment are represented by the same symbols and detailed explanations of these parts and members are not described and the following explanations center on the points different from those of the first embodiment.

FIGS. 18(a) to 18(c) are explanatory views showing the outline of the frontside member 11 constituting the holder for refuelling container in this embodiment, wherein FIG. 18(a) is a front view of the frontside member 11, FIG. 18(b) is a side view of the frontside member 11 and FIG. 18(c) is a rear elevational view of the frontside member 11. All these figures show the condition of the frontside member 11 to which the lever 30 is fitted. Also, FIGS. 19(a) to 19(c) are explanatory views showing the outline of the backside member 12 constituting the holder for refuelling container in this embodiment, wherein FIG. 19(a) is a front view of the backside member 12, FIG. 19(b) is a side view of the backside member 12 and FIG. 19(c) is a rear elevational view of the backside member 12.

Also, in this embodiment, the holder 10 may be designed to be constituted of the frontside member 11 and backside member 12 which are divided along a vertical direction and the refuelling container C can be received between the frontside member 11 and backside member 12 which are integrated with each other. Although, as mentioned above, the frontside member 11 and the backside member 12 may be integrated with each other by engaging the engaging crawl 11a disposed on the frontside member 11 side with the engaging hole 12a disposed on the backside member 12 side, the both may be integrated by disposing an engaging groove corresponding to the engaging crawl 11a provided on the frontside member 11 side.

In the illustrated example, the lever 30 is fitted only to the frontside member 11 side. Along with this, the shape of the vertical section of the refuelling container C is asymmetric with respect to the center axis of the mouth part (see FIG. 16(c)).

Also, on the upper end side of the lever 30, an operation part 30b having a concave form so as to fit to the thick of the thumb is formed on the assumption that, for example, a user operates using the thumb. On the other hand, in a frontside member 11, a cave part 10c that sinks into a conical form from the surface of the frontside member 11 is formed so that the cave part 10c surrounds the operation part 30b of the lever 30.

With this structure, the operation part 30 is easily pushed and also, among the fingers pushing the operation part 30b, the part sticking out from the operation part 30b touches the cave part 10c to thereby prevent the lever 30 from being pushed down more, thereby functioning as a limiting mechanism.

The surrounding part made relatively higher than the cave part 10c corresponds to the protrusion in the first embodiment described above. Also, though not particularly illustrated, a flange is disposed around the operation part 30b and interferes with the cave part 10c when the lever 30 is pushed down and this mechanism may be adopted as the limiting mechanism.

In the illustrated example, a working part 30a of the lever 30 is positioned spreading over right and left widths of a stopper 33 so as to be closer to the rotating axis of the lever 30 than the operation part 30b, specifically, closer to the convex part 32 disposed on the arm 31. Then, the working part 30a is designed to push the vicinity of the center of the refuelling container C over a wide area, with the result that the lever 30 can be pushed down by light operational force.

As mentioned above, in this embodiment, each shape of the frontside member 11, the backside member 12 and the lever 30 is changed so that it is suitable for more promotion of miniaturization than in the case of the first embodiment. Other structures are not largely different from those of the first embodiment and therefore, detailed explanations will be not described.

Also, in this embodiment, various modifications of this embodiment are possible. For example, as shown in FIGS. 20(a) to 20(c), an opening part 20 is formed on the frontside member 11 in a manner as to expose only the operation part 30b of the lever 30 on the surface to thereby reduce the exposed part of the lever 30, whereby a structure by which misoperations are less occurred can be made.

FIGS. 20(a) to 20(c) are explanatory views showing a modification of the second embodiment corresponding to FIGS. 16(a) to 16(c), wherein FIG. 20(a) is a front view like FIG. 16(a), FIG. 20(b) is its side view and FIG. 20(c) is a sectional view corresponding to the section along the line H-H in FIG. 20(a).

As mentioned above, the present invention provides a refuelling container for fuelcell operated in the fuelcell, such as a direct methanol type fuelcell, using a system which causes an electrochemical reaction by supplying liquid fuel such as alcohols directly without using a reformer, the container being used to inject and supply the fuel from the outside to a fuel receiving part of the body side reduced in the residual amount of the fuel. The present invention also provides a method for refuelling and a holder for refuelling container that receives the refuelling container.

What is claimed is:

1. A refuelling container for fuelcell to inject fuel for refuelling from an outside to a fuel receiving part of a fuelcell body,
wherein the container is designed to reduce a volume of the container while keeping airtight communication with an inside of said fuel receiving part to inject the fuel in a predetermined amount into said fuel receiving part, and then restore an original volume of the container to absorb atmospheric gas in said fuel receiving part, and wherein
in case it is defined that
a volume of said fuel receiving part, which is a subject of the fuel to be injected and is supplied is $V_T$; and
allowable pressure in said fuel receiving part is Ptf,
when one of a volume $V_{CL}$ of the fuel in said refueling container just before a fuel injecting operation and a reduction volume Vs in the refueling container when the fuel is injected is determined together with a volume Vc of the refueling container where a volume of the fuel in said fuel receiving part, which is supposed to be injected when a fuel injecting operation is made, is $V_{TL}$,
it is designed that said volume $V_{CL}$ or said reduction volume Vs does not exceed a predetermined volume and a relationship given by the following equation (1)

$$(V_c - V_{CL} + V_T - V_{TL})/(V_c - V_{CL} + V_T - V_{TL} - Vs) \leq Ptf/P \tag{1}$$

is established and
wherein an environmental pressure is P.

2. The refuelling container for fuelcell according to claim 1,
wherein the container is formed of a flexible material.

3. The refuelling container for fuelcell according to claim 1, wherein the container being received in a holder which is made of a rigid material and provided with an operation part reducing the volume of said refuelling container.

4. The refuelling container for fuelcell according to claim 3, wherein a limiting mechanism is disposed in an operation part of said holder such that the reduction in the volume of said refuelling container does not exceed a fixed volume.

5. The refuelling container for fuelcell according to claim 3, wherein said operation part is provided with a lever fitted thereto in a rotatable manner, and
when said lever is pushed down by a rotational operation, said lever is pressed against said refuelling container to reduce the volume of said refuelling container.

6. The refuelling container for fuelcell according to claim 5, wherein at least said lever is formed by molding from a highly transparent material.

7. The refuelling container for fuelcell according to claim 5, wherein a protrusion is formed such that the protrusion partially surrounds a side surface of said lever and is protruded so as to project on a same plane as or from an operating plane of said lever, to thereby restrict an operating range of said lever.

8. The refuelling container for fuelcell according to claim 3, wherein an upright protective wall configured to cover an opening part of said refuelling container is disposed in the holder and a cap is screw-fitted to said protective wall.

9. The refuelling container for fuelcell according to claim 3, wherein said refuelling container with a body part having an elliptic section in a horizontal direction is received in the holder such that said operation part faces a plane along a direction of a major diameter of said body part.

10. The refuelling container for fuelcell according to claim 1, wherein an initial volume of fuel to be injected to the refuelling container is the $V_{CL}$.

11. A method of manufacturing a refuelling container for injecting and supplying fuel to a fuel receiving part of a fuelcell body from an outside,
wherein the refuelling container is designed after reducing a volume of the refuelling container and injecting a predetermined volume of the fuel to the fuel receiving part while keeping airtight communication with an inside of said fuel receiving part, and then restoring an original volume of the refuelling container by inhaling an atmospheric gas contained in said fuel receiving part,
the method comprising:
designing the refuelling container such that the relationship given by the following equation (1) is established when;
a volume of said fuel receiving part is $V_T$;
a volume of the fuel in said fuel receiving part just before a fuel injecting operation is $V_{TL}$;
a volume of said refuelling container is $V_c$;
a volume of the fuel in said refuelling container just before the fuel injecting operation is $V_{CL}$;
a reduction volume of the refuelling container when the fuel is injected is Vs;
allowable pressure in the fuel receiving part is Ptf; and
an environmental pressure is P:

$$(V_c - V_{CL} + V_T - V_{TL})/(V_c - V_{CL} + V_T - V_{TL} - Vs) \leq Ptf/P \tag{1}.$$

12. A combination comprising:
a fuelcell body having a fuel receiving part with a volume $V_T$ and allowable pressure Ptf; and
a refuelling container designed after reducing the volume of the refuelling container and injecting a predetermined volume of the fuel to the fuel receiving part while keeping airtight communication with an inside of said fuel receiving part, and then restoring an original volume of the refuelling container by inhaling an atmospheric gas contained in said fuel receiving part,
wherein the refuelling container is designed such that the relationship given by the following equation (1) is established when;
a volume of the fuel in said fuel receiving part just before a fuel injecting operation is $V_{TL}$;
a volume of said refuelling container is $V_c$;
a volume of the fuel in said refuelling container just before the fuel injecting operation is $V_{CL}$;
a reduction volume of the refuelling container when the fuel is injected is Vs; and
an environmental pressure is P:

$$(V_c - V_{CL} + V_T - V_{TL})/(V_c - V_{CL} + V_T - V_{TL} - Vs) \leq Ptf/P \tag{1}.$$

* * * * *